(12) United States Patent
Yamamoto et al.

(10) Patent No.: US 6,308,006 B1
(45) Date of Patent: Oct. 23, 2001

(54) INFORMATION STORAGE MEDIUM AND APPARATUS FOR REPRODUCING THE SAME

(75) Inventors: Kaoru Yamamoto, Tsurugashima; Takao Sawabe, Tokyo-to; Hidehiro Ishii; Shozo Ema, both of Tokorozawa; Tokihiro Takahashi, Kawagoe, all of (JP)

(73) Assignee: Pioneer Electronic Corporation, Tokyo-to (JP)

( * ) Notice: Subject to any disclaimer, the term of this patent is extended or adjusted under 35 U.S.C. 154(b) by 0 days.

(21) Appl. No.: 09/270,658

(22) Filed: Mar. 16, 1999

(30) Foreign Application Priority Data

Mar. 16, 1998 (JP) .............................................. P10-065057

(51) Int. Cl.[7] .................................................. H04N 5/928
(52) U.S. Cl. ............................ 386/96; 386/105; 386/125; 386/126; 386/95
(58) Field of Search .................................. 386/46, 95, 96, 386/112, 124, 104, 105, 125, 126; 369/34

(56) References Cited

U.S. PATENT DOCUMENTS

| | | | |
|---|---|---|---|
| 5,734,787 | * 3/1998 | Yonemitsu et al. | 386/126 |
| 6,118,738 | * 9/2000 | Uchara | 369/34 |
| 6,118,927 | * 9/2000 | Kikuchi et al. | 386/95 |

* cited by examiner

*Primary Examiner*—Huy Nguyen
(74) *Attorney, Agent, or Firm*—Morgan, Lewis & Bockius LLP

(57) ABSTRACT

An information storage medium includes: a video zone for recording audio/video information including video information and audio information associated with the video information; an audio zone for recording audio information; first navigation information for a video player which can reproduce the audio/video information; second navigation information for an audio player which can reproduce the audio information in the video zone and the audio information in the audio zone; and third navigation information for a compatible player which can reproduce both the audio/video information and the audio information. The first navigation information, the second navigation information and the third navigation information are recorded separately from each other.

12 Claims, 11 Drawing Sheets

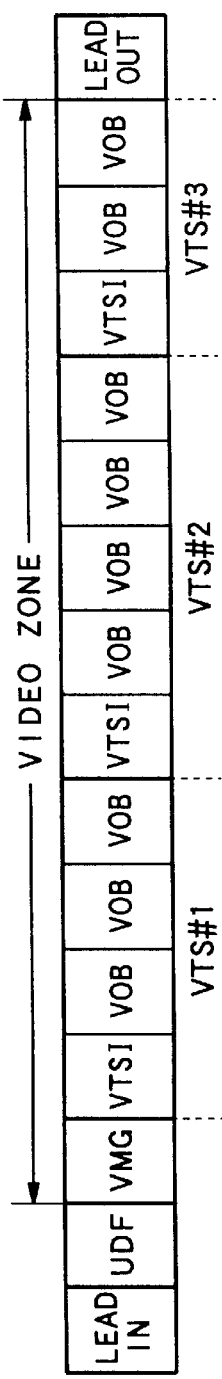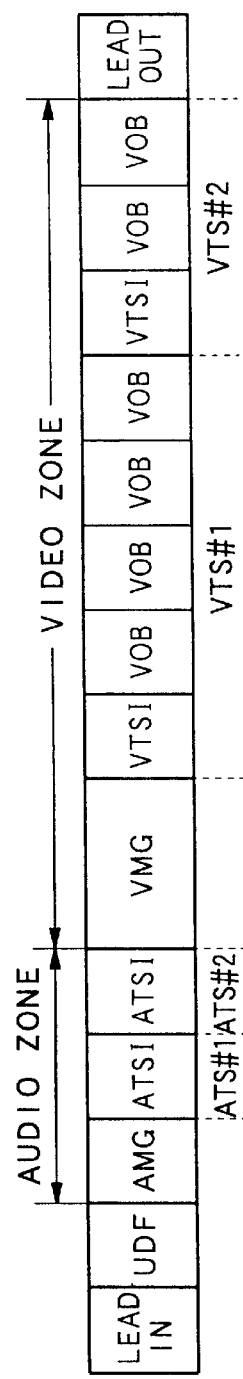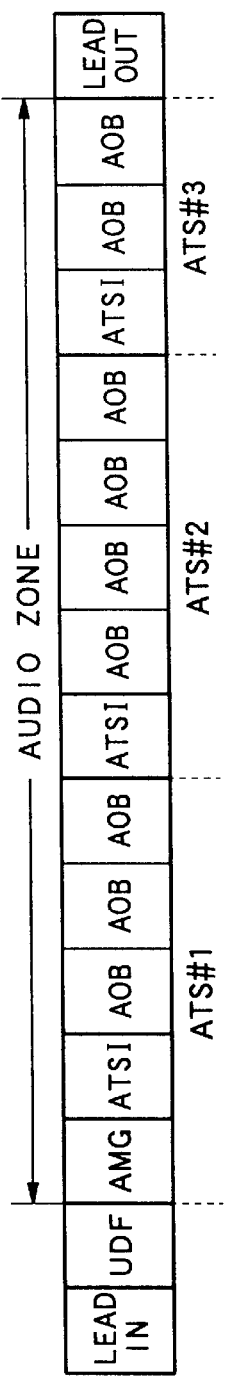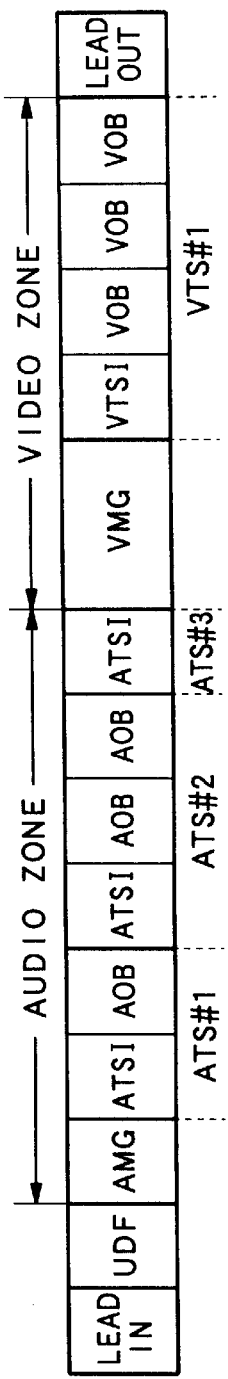
FIG. 5A VIDEO DVD
FIG. 5B VIDEO DVD WITH AUDIO NAVIGATION
FIG. 5C AUDIO-ONLY DVD
FIG. 5D VIDEO/AUDIO DUAL-USE DVD

INFORMATION STORAGE MEDIUM AND APPARATUS FOR REPRODUCING THE SAME

BACKGROUND OF THE INVENTION

1. Field of the Invention

This invention relates to an information storage medium, and more specifically to the reproduction of DVD disc having a video zone in which picture information and associated sound information are mainly recorded and an audio zone in which sound information is mainly recorded.

2. Description of the Prior Art

There is known a video DVD (i.e., a disc in conformity with the DVD-Video Standard) on which picture information such as movies are recorded. A video DVD is broadly used as an information storage medium for picture information such as movies because of its large storage capacity. Further, there has been developed an audio DVD (i.e., a disc in conformity with the Audio-DVD Standard) adapted to record, not picture information such as movies, but only audio information such as music. A single audio DVD can record audio information corresponding to plural CDs (Compact Disc) because of its large storage capacity. Also, in addition to picture information of a movie, audio information of a soundtrack CD for the movie can be recorded together on a single audio DVD.

In such circumstance, it is forecasted that a so-called compatible DVD player, having an ability to reproduce both audio DVD and video DVD, will be developed and used in the near future. However, simply recording video information and audio information on a single disc according to the DVD-Video Standard and the VD-Audio Standard may restrict desired various manners of reproduction by the compatible DVD player. Specifically, the following drawbacks are presumable. First, since only the navigation information (i.e., a control information used to reproduce information) for video information is recorded in the video zone according to the DVD-Video Standard, only the audio information recorded in the video zone normally cannot be reproduced separately from the associated video information. In addition, the reproduction is limited to such manners that titles in the audio zone are reproduced and then titles in the video zone are reproduced, or in the reversed order. Namely, it is not possible to control the reproduction of all titles recorded in the video zone and audio zone of a single disc in an intermixed manner.

SUMMARY OF THE INVENTION

It is an object of the present invention to provide an information storage medium including a video zone and an audio zone, which can be reproduced by a compatible player with taking the best advantage of the information storage medium and the compatible player.

It is another object of the present invention to provide an information reproduction apparatus that enables such appropriate reproduction of the information storage medium.

According to one aspect of the present invention, there is provided an information storage medium including: a video zone for recording audio/video information including video information and audio information associated with the video information; an audio zone for recording audio information; first navigation information for a video player which can reproduce the audio/video information; second navigation information for an audio player which can reproduce the audio information in the video zone and the audio information in the audio zone; and third navigation information for a compatible player which can reproduce both the audio/video information and the audio information, wherein the first navigation information, the second navigation information and the third navigation information are recorded separately from each other.

In the storage medium thus configured, different navigation information are prepared for different kinds of video players, and each player performs the reproduction based on the dedicated navigation information. Therefore, the video player can perform reproduction with taking the possible best advantage of its ability.

Preferably, the first navigation information may define a reproduction manner of the audio/video information from the video zone, the second navigation information may define a reproduction manner of the audio information from the audio zone and a reproduction manner of only the audio information from the video zone, and the third navigation information may define a reproduction manner of the audio information from the audio zone and a reproduction manner of the audio/video information from the video zone.

In a preferred embodiment, one or more title, which is a unit of reproduction, is recorded on the storage medium, and the title is classified into audio titles formed by the reproduction of the audio information in the audio zone and video titles formed by the reproduction of the audio/video information in the video zone. Thus, a plurality of titles can be defined in the same storage medium in such a manner that they can be reproduced by the players of different type in different reproduction manners.

Preferably, the video titles may include at least one dual-use title in which the audio/video information is reproduced by the video player and the compatible player and the audio information in the audio/video information is reproduced by the audio player.

The first navigation information may indicate a recording position on the storage medium of reproduction control information used for reproducing the audio/video information in the video title, the second navigation information may indicate a recording position on the storage medium of reproduction control information used for reproducing the audio information in the audio title and indicates a recording position on the storage medium of reproduction control information used for reproducing the audio information in the dual-use title, and the third navigation information may indicate a recording position on the storage medium of reproduction control information used for reproducing the audio/video information in the video title including the dual-use title and indicates a recording position on the storage medium of reproduction control information used for reproducing the audio information in the audio title. Thereby, each kind of player refers to the dedicated navigation information to obtain the reproduction control information, and reproduces recorded information according to the reproduction control information thus obtained.

The first navigation information may be recorded in the video zone, and the second and the third navigation information may be recorded in the audio zone. Thus, information recorded in the zones of different recording format can be managed separately. The reproduction control information of the video title may be recorded in the video zone, and the reproduction control information of the audio title may be recorded in the audio zone. Thus, the titles and corresponding reproduction control information can be recorded and managed together, and this facilitates the control in reproduction.

In a preferred embodiment, the reproduction control information of the dual-use title includes the reproduction control information for the audio player which is recorded in the audio zone and the reproduction control information for the compatible player which is recorded in the video zone. This enables reproducing the dual-use titles by any one of the audio player, the video player and the compatible player.

With respect to the video title which is a dual-use title, the reproduction control information of the dual-use title which is specified by the third navigation information and the reproduction control information of the video title which is specified by the first navigation information may be recorded at an identical. With respect to the audio title, the reproduction control information of the audio title which is specified by the third navigation information and the reproduction control information of the audio title which is specified by the second navigation information may be recorded at an identical position. Accordingly, common reproduction control information can be used for different navigation information.

According to another aspect of the present invention, there is provided an information reproduction apparatus which reproduces information from an information storage medium including: a video zone for recording audio/video information including video information and audio information associated with the video information; an audio zone for recording audio information; first navigation information for a video player which can reproduce the audio/video information; second navigation information for an audio player which can reproduce the audio information in the video zone and the audio information in the audio zone; and third navigation information for a compatible player which can reproduce both the audio/video information and the audio information, wherein the first navigation information, the second navigation information and the third navigation information are recorded separately from each other, the reproduction apparatus including: an identifying unit for identifying the apparatus as one of the video player, the audio player and the compatible player; a selecting unit for selecting one of the first navigation information, the second navigation information and the third navigation information based on the identification by the identifying unit; and a reproducing unit for reproducing recorded information from the storage medium based on the navigation information selected by the selecting unit.

In accordance with the information reproduction apparatus, the identifying unit identifies its own type, and the selecting unit selects the navigation information adapted to that type of player. The reproducing unit reproduces the recorded information based on the navigation information dedicated to the player of that type. Therefore, each player can reproduce information with advantageously using its ability.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIGS. 5A to 5D are diagrams showing the classification of types of DVD;

DETAILED DESCRIPTION OF THE PREFERRED EMBODIMENTS

Referring to the accompanying drawings, preferred embodiments of the present invention will be now explained.

(1) Video DVD Format

At first, a recording format (physical recording format) of video information and audio information (including music information) on a video DVD will be explained by referring to FIG. 1.

(1.1) Physical Format

Figure 1:
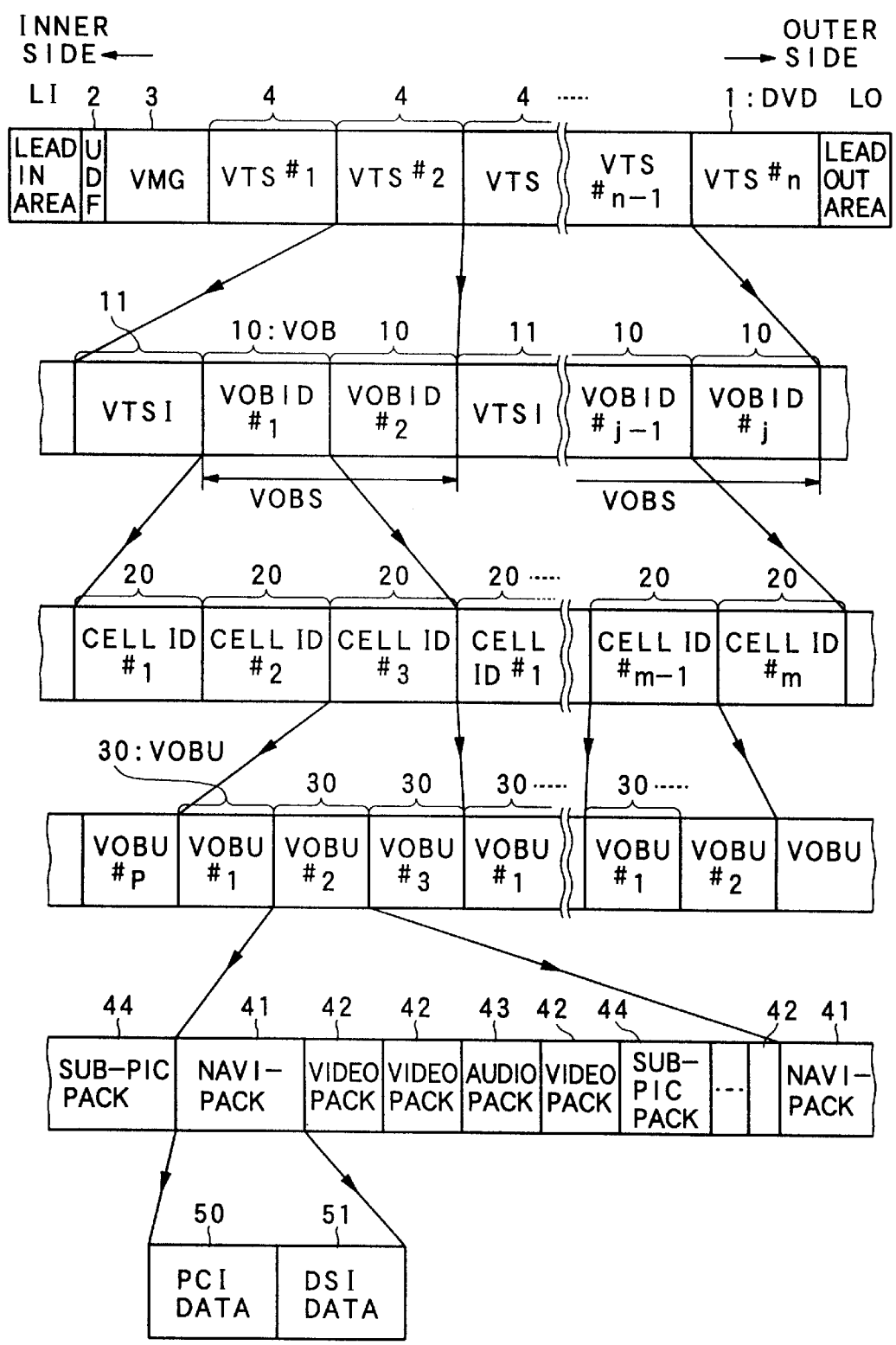
FIG. 1 is a diagram showing a physical structure (physical format) of a video DVD.

As shown in FIG. 1, a video DVD 1 is provided with a lead-in area LI at its most inner circumferential portion and a lead-out area LO at its most outer circumferential portion, between which a video zone is formed. In the video zone, video information and audio information are recorded such that they are divided into a plurality of VTSs (Video Title Sets) 4, each of which has a unique ID (Identification) number (i.e. VTS#1 to VTS#n). Here, the VTS 4 is a set (bundle) of titles (each of which is one production or one work which an author or producer intends to offer to the audience), which are related to each other (e.g., which attribute, such as the number, the specification, the corresponding languages etc. of audio and video information is the same to each other). At the outer circumferential portion of the lead-in area LI, UDF (Universal Disk Format) 2 including format management information of files recorded on the DVD is recorded, followed by a VMG (Video ManaGer) 3. In the VMG 3, for example, management information related to the whole video and audio information recorded on the DVD 1, such as a menu providing a user of selective items, information for preventing an illegal copy, an access table for directly accessing each title and so on, is recorded.

One VTS 4 is recorded such that it is divided into a plurality of VOBs (Video OBjects) 10, each of which has an ID number (VOB D#1, VOB ID#2, . . . ), and VSTI (Video Title Set Information) 11 are disposed ahead of the VOBs 10. Here, a data portion constructed by a plurality of VOBs 10 is referred to as a VOB set (VOBS).

In the VTSI 11 recorded at the head of the VTS 4, information such as PGCI (ProGram Chain Information), which is various information related to a program chain as a logical division obtained by combining a plurality of cells (the "cell" will be described later in detail), is recorded. In each VOB 10, the substantial parts of the video and audio information other than the control information are recorded.

One VOB 10 is constructed of a plurality of cells 20, each of which has an ID number (cell ID#1, cell ID#2, . . . ). One cell 20 is constructed of a plurality of VOB units (VOBUs) 30, each of is which has an ID number (VOBU#1, VOBU#2, . . . ). Here, the VOB unit 30 is an information unit, each of which includes the video information, or the audio information and sub-picture information (a sub-picture such as subtitles of a movie etc.), or a navi-pack described later.

One VOB unit 30 is provided with a navi-pack (a navigation pack) 41 which is control information of picture information included in the VOBU 30, video packs 42 including video data serving as picture information, audio packs 43 including audio data serving as sound information, and sub-picture packs 44 including sub-picture data serving as sub-picture information. Here, only picture data is recorded as the video data, and only sound data is recorded as the audio data. In addition, only graphic data such as characters and figures serving as sub-picture is recorded as he sub-picture data. In a pack header (not shown) recorded at he head of each pack, read-out start time information called SCR System Clock Reference) and start code indicating the beginning of the pack are recorded. The SCR indicates the read-out start timing on the reproduction time axis at which data recorded in the respective packs should be read out from a track buffer of a reproduction apparatus described later and supplied to following plural buffers.

The navi-pack 41 is provided with DSI (Data Search Information) data 51 including search information to search video picture or audio sound desired to be displayed or sound-outputted (concretely, search information such as an address on the DVD 1, where the video or audio information to be displayed or sound-outputted is recorded), and PCI (Presentation Control Information) data 50 including information related to a display control at a time of displaying the video image or outputting the audio sound, which is searched on the basis of the DSI data 51. All video packs 42 included in one VOBU 30 consist of at least one GOP (Group Of Pictures). The GOP is a minimum picture unit, which can be independently reproduced and which is determined by a standard based on the MPEG (Moving Picture Experts Group) 2 system. The MPEG 2 system is a picture compression system adopted in recording the video information onto the DVD 1 in the present embodiment.

In the above explained recording format having a hierarchical structure as shown in FIG. 1, each division can be freely set according to the author's intention so as to perform recording on the basis of these set divisions. By performing the reproduction on the basis of a later described logical structure for each of these divisions, the reproduction can be performed in various ways.

(1.2) Logical Format

Next, a logical format (logical structure) constructed by combining the information recorded by the physical divisions shown in FIG. 1 will be explained with reference to FIG. 2. It is noted that information is not actually recorded on the DVD 1 in the logical structure of FIG. 3, but reproduction control information (e.g. access information or time information) to reproduce each data shown in FIG. 1 by combining them (especially combining the cells 20) in the logical structure shown in FIG. 2, is recorded on the DVD 1, especially in the VTSI 11.

Figure 2:
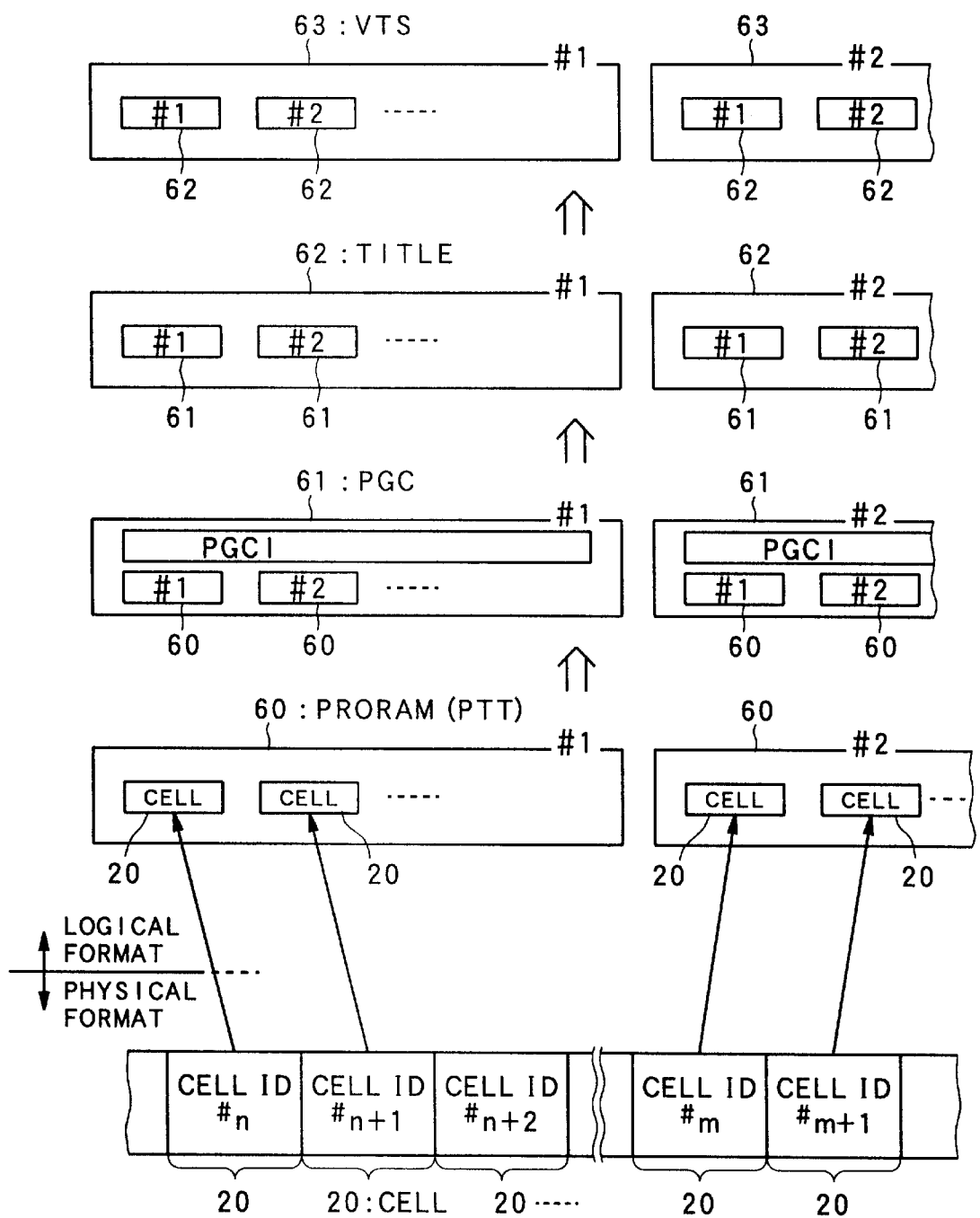
FIG. 2 is a diagram showing a logical structure (logical format) of a video DVD.

To make the explanation clear, the following explanation is made from the lower hierarchical layer in FIG. 2. One program 60 is logically constructed on the basis of the author's intention by selecting and combining a plurality of cells 20 in the physical structure explained by use of FIG. 1. The program 60 is also a minimum logical unit, which division can be identified by a system controller of a reproduction apparatus described later and which can be accessed by use of a command by the system controller. It is also possible for the author to define a gathering of one or more programs 60 as a minimum unit, which can be freely selected to be watched or listened to by the audience and which is referred to as a PTT (ParT Of Title).

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG. 2, the number is treated as the ell number in the order of description in the PGCI described later.

By combining a plurality of programs 60, one PGC (ProGram Chain) 61 is logically constructed. The aforementioned PGCI ProGram Chain Information) is defined by the unit of the PGC 61. The PGCI includes information indicating the reproduction order of each cell 20 at the time of reproducing each program 60 (by this reproduction order, a unique program number (#1, #2, . . . ) is assigned to each program 60), an address which is a record position of each cell 20 on the DVD 1, the number of the cell 20 positioned at the head of one program 60 to be firstly reproduced, and so on.

In one PGC 61, the substantial video and audio data etc. are included as a combination of the programs 60 (in other words, as the combination of the cells 20), in addition to the above mentioned PGCI.

One title 62 is logically constructed of one or a plurality of PGCs 61 (PGC #1, PGC#2, . . . ) as shown in FIG. 2. The title 62 is, for example, a unit corresponding to one movie, and is complete information which the author would like to offer to the audience of the DVD 1.

One VTS 63 is logically constructed of one or a plurality of titles 62 (title #1, title #2, . . . ). The information included in one VTS 63 shown in FIG. 2 corresponds to information included in one VTS 4 shown in FIG. 1. Namely, all information included in the logical VTS 63 shown in FIG. 2 is recorded as one VTS 4 in the DVD 1 shown in FIG. 1.

As the author specifies the information divided in the physical structure on the DVD 1 on the basis of the above described logical format, the video image (e.g. the movie image) for the audience is formed.

(2) Audio DVD Format

Next, the recording format of audio information (including music and voice information) on an audio DVD will be described with reference to FIG. 3.

(2.1) Physical Format

First, the physical format of the audio DVD will be described with reference to FIG. 3.

Figure 3:
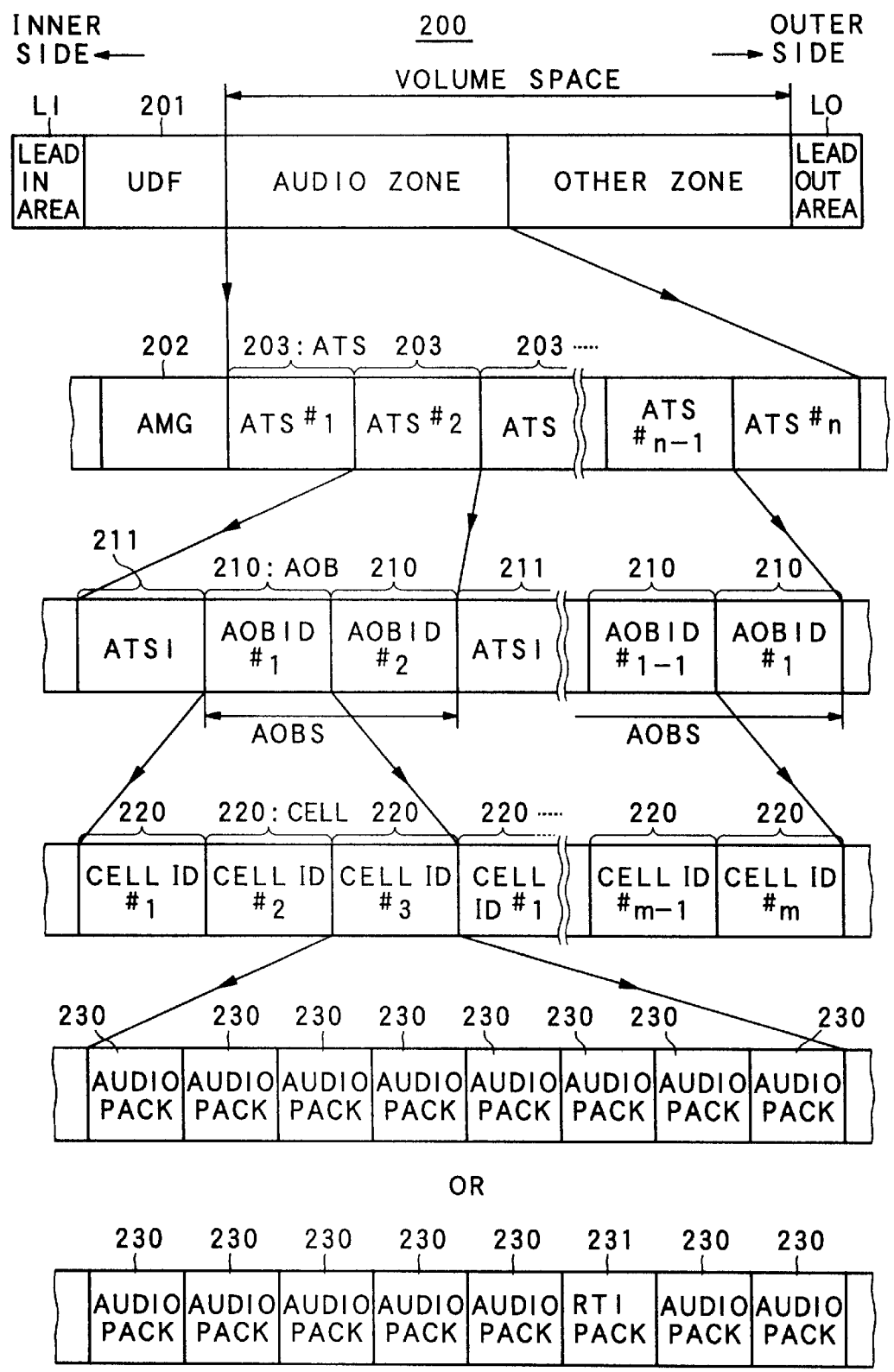
FIG. 3 is a diagram showing a physical structure (physical format) of an audio DVD.

As shown in FIG. 3, an audio DVD 200 is provided with a lead-in area LI at its most inner circumferential portion and a lead-out area LO at its most outer circumferential portion, between which a volume space is formed. In the volume space, an audio zone is recorded without exception. In this audio zone, audio information is recorded in a manner divided into a plurality of ATSs (Audio Title Sets) 203, each of which has a unique ID (Identification) number (i.e. ATS#1 to ATS#n). At the outer circumferential portion of the lead-in area LI, UDF (Universal Disk Format) 201 including format management information of files recorded on the DVD is recorded, followed by an AMG (Audio ManaGer) 202. In the AMG 202, for example, information related to the whole audio information recorded on the audio DVD 200, such as a menu providing selective items to a user, information for preventing an illegal copy, an access table for directly accessing each title and so on, is recorded.

One ATS 203 is recorded such that it is divided into a plurality of AOBs (Audio OBjects) 210, each of which has an ID number (AOB ID#1, AOB ID#2, . . . ), and ASTI (Audio Title Set Information) 211 is disposed ahead of the AOBs 210. Here, a data portion constructed by a plurality of AOBs 210 is defined as an AOB set (AOBS) as shown in FIG. 3. The AOBS is the substantial part of audio information.

In the ATSI 211 recorded at the head of the ATS 203, information such as APGCI (Audio ProGram Chain Information), which is various information related to a program chain as a logical division obtained by combining a plurality of cells (the "cell" will be described later in detail), is recorded. In each AOB 210, the substantial part of the audio information is recorded in addition to the control information.

One AOB 210 is constructed of a plurality of cells 220, each of which has an ID number (cell ID#1, cell ID#2, . . . ). One cell 220 is constructed of a plurality of audio packs 230 or the combination of the audio packs 230 and real-time information packs 231, each being packed. The audio pack 230 is produced by packing audio information to be recorded on the audio DVD into a preset size, and includes audio information digitized by a linear-PCM system, for example. The real-time information pack 231 includes text information, BPM (Beat Per Minute), beat information, etc.

In the above explained recording format having a hierarchical structure as shown in FIG. 3, each division can be freely set according to the author's intention so as to perform recording on the basis of these set divisions. By performing the reproduction on the basis of a later described logical structure for each of these divisions, the reproduction can be performed in various ways.

(2.2) Physical Format

Next, a logical format (logical structure) constructed by combining the information recorded by the physical divisions shown in FIG. 3 will be explained with reference to FIG. 4. It is noted that information is not actually recorded on the audio DVD 200 in he logical structure of FIG. 4. Namely, audio information is recorded on the audio DVD 200 according to the logical format shown in FIG. 3, and reproduction control information to reproduce them is recorded in the AMG 202 and ATSI 211 according to the format shown in FIG. 4.

Figure 4:
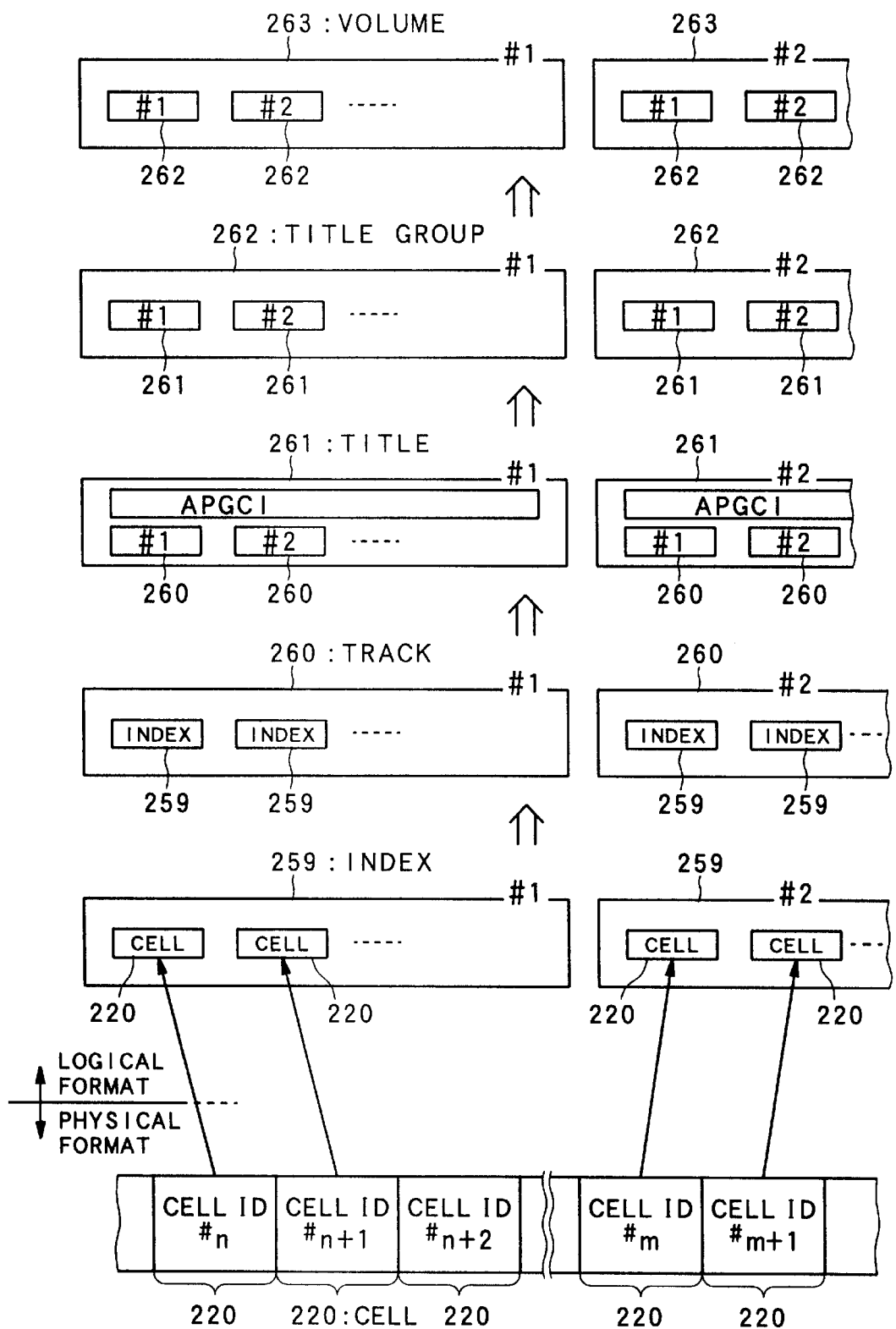
FIG. 4 is a diagram showing a logical structure (logical format) of an audio DVD.

To make the explanation clear, the following explanation is made from the lower hierarchical layer in FIG. 4. One index 259 is logically constructed by selecting and combining a plurality of cells 220. The index 259 is a minimum logical unit, which may be used as a song number. Here, as for the number of each cell 220, when treating the cell 220 on the physical format shown in FIG. 3, the number is treated as the cell ID number (which is indicated by cell ID # in FIG. 3). On the other hand, when treating the cell 220 on the logical format shown in FIG. 4, the number is treated as the cell number in the order of description in the APGCI described later. One or more index 259 logically constitutes one track 260, which is an information unit corresponding to one song. A user can arbitrarily select tracks (i.e., songs) and directly access them. The track 260 is an information unit including a plurality of cells 220, and is a collection of cells 220 having a certain common attribute. Namely, all cells 220 in the same track have the same attributes. In addition, all cells 220 included in a track are recorded in the same object in a manner neighboring to each other.

By combining one or more tracks 260, one title (audio title) 261 is logically constructed. However, it is noted that the title itself is not recognized by a user as an access unit, and hence it is not possible for the user to access a certain title by designating the title number. In the audio DVD, the attribute of each track 260, constituting the title 261, may be defined from plural patterns, e.g., 8 patterns independently. Namely, different attributes as audio information, such as the channel number, quantization method, sampling frequency, etc., may be set to different tracks (songs). The aforementioned APGCI is defined in the unit of the title 261, and the APGCI includes the attributes of the tracks, the reproduction order of cells 220 for each track 260 when reproducing each track 260, the addresses indicating the recording positions of the respective cells 220 on the audio DVD 200, the number of the head cell 220 which is to be reproduced in a track 260, the reproduction method of each track 260 and other various commands. In a title 261, in addition to the APGCI, the substantial audio information is included as the combination of the tracks (songs) 260 (in other words, as the combination of the cells 220).

One or more title 261 logically constructs one title group 262, which is a maximum information unit that the user can access. Up to 9 title groups, at maximum, can be defined in a single volume. The title group 262 is constructed by one or more title 261 which are collected according to a certain relevance. For example, songs of a certain singer or a composer can be collected as a title group. A volume 263 is logically constructed by one or more title group 262, and the volume 263 is an information unit corresponding to one album (DVD). On the audio DVD, the actual audio information included in one title 261 shown in FIG. 4 is recorded in one of the ATSs 203 shown in FIG. 3.

As the author specifies the information divided in the physical structure on the basis of the above described logical format, music that the audience listens to is formed.

(3) Classification of DVD

Next, the kinds of DVD will be described. It is noted that, in the following description, with respect to information recorded on DVD, information including both picture and sound, such as a movie, will be referred to as "AV (Audio/Video) information", and only the picture information part of the AV information will be referred to as "video (or picture) information". Similarly, only the audio information part of the AV information such as a movie as well as audio information such as music, which is audio only due to its nature, will be referred to as "audio (or sound) information".

As a DVD player which reproduces each kind of DVD disc, there are three types: a video DVD player, an audio DVD player and a compatible DVD player. The video DVD player is capable of reproducing AV information according to the video DVD format and is hereinafter simply referred to as "video player". The audio DVD player is capable of reproducing only audio information according to the audio DVD format and is hereinafter simply referred to as "audio player". The compatible DVD player is capable of reproducing both AV information according to video DVD format and audio information according to audio DVD format and is hereinafter simply referred to as "compatible player". The details of those players will be described later.

As a DVD which records AV information or audio information, there are four kinds of discs: a video DVD, an DVD with audio navigation, an audio-only DVD and audio/video dual-use DVD. FIGS. 5A to 5D schematically show the physical recording format of those four kinds of DVDs. It is noted that those four kinds of DVDs have the same physical disc shape and information recording system (such as the modulation system, the track pitch, the pit size, etc.) and only differ in their information contents recorded.

(3.1) Video DVD

FIG. 5A shows a video DVD on which video information such as a movie and audio information to be reproduced simultaneously (i.e., AV information) are recorded. Therefore, there is only a video zone between the lead-in area LI and the lead-out area LO. Reproduction control information, video information and audio information are recorded in a plurality of VTSs, and a VMG including the management information of those VTSs is additionally recorded. As described above with referring to FIG. 1, video information is recorded as video packs and audio information is recorded as audio packs. A video DVD is reproducible by a video player and a compatible player based on navigation information (information which defines reproduction control information, described later in detail) included in the management information in the VMG. However, a video DVD cannot be reproduced by an audio player because no navigation information according to the audio DVD format is recorded.

(3.2) Video DVD with Audio Navigation

FIG. 5B shows a video disc called "video DVD with audio navigation". Like a normal video DVD, video information such as a movie can be reproduced from the video DVD with audio information. Further, in the case of the above DVD with audio navigation, since navigation information according to the audio DVD format is additionally recorded, the audio information part of AV information included in VOBs within VTS can be reproduced by an audio player. The part of the AV information, from which only audio information can be reproduced by an audio player, is called "audio play part".

The recording format of a video DVD with audio navigation is in conformity with the video DVD format shown in FIG. 1, and hence AV information is recorded in the video zone in a form of a plurality of VTSS. In addition, in a video DVD with audio navigation, an audio zone is formed inside of the video zone. In the audio zone, ATSI serving as reproduction control information necessary to reproduce only audio information in VTSs is recorded as ATS, and AMG is also recorded as the management information for the ATSs. AOB, which is the substantial part of the audio information, is not recorded in those ATSs in the audio zone. In other words, navigation information needed to reproduce audio information included in each VTSs of this DVD (i.e., the audio packs of the audio play part in each VOB) by an audio player is described in the AMG and ATSI. A video DVD with audio navigation is reproducible by a video player and a compatible player based on the navigation information recorded in the VMG. Further, audio information in the audio play part can be reproduced by an audio player based on the navigation information recorded in the AMG.

(3.3) Audio-only DVD

FIG. 5C shows an audio-only DVD on which only audio information is recorded with the exception of slight still picture and text information. Therefore, only an audio zone exists between the lead-in area LI and the lead-out area LO. In the audio zone, reproduction control information (i.e., ATSI) and audio information (i.e., AOBs) are recorded as a plurality of ATSs, and an AMG including management information of them is also recorded. Each ATS includes one or more AOBs which are the substantial parts of audio information. An audio-only DVD is reproducible by an audio player and a compatible player based on navigation information recorded in the AMG. However, an audio-only DVD cannot be reproduced by a video player because no navigation information according to the video DVD format is recorded.

(3.4) Audio/Video Dual-use DVD

FIG. 5D shows an audio/video dual-use DVD, to which the present invention is mainly directed. Between the lead-in area LI and the lead-out area LO, both an audio zone and a video zone are formed. In the video zone, VMG as well as VTS including reproduction control information and AV information serving as substantial information are recorded in the same manner as the video DVD. In the audio zone, AMG as well as a plurality of ATSs (ATS#1 and ATS#2 in FIG. 5D) including reproduction control information and audio information serving as substantial information are recorded. Further, in the audio zone, an ATS (ATS#3 in FIG. 5D) including reproduction control information for reproducing only the audio information in VOBs in the video zone is recorded. Namely, in the audio/video dual-use DVD, AV information according to the video DVD format and audio information according to the audio DVD format are recorded in separate areas. In the case of audio/video dual-use DVD, AMG includes not only the management information for all ATSs in the audio zone, but the management information for all ATSs and VTSs in the audio zone and the video zone in an intermixed manner. This will be described later in more detail.

The audio/video dual-use DVD is different from the video DVD with audio navigation and audio-only DVD in the following points. A first difference is that the audio/video dual-use DVD has separately formed audio zone and video zone in which AV information according to the video DVD format and audio information according to the audio DVD format are recorded, respectively. A second difference is that the AMG recorded in the audio zone includes the management information associated with all ATSs and VTSs in the whole disc.

Specifically, in the DVD with audio navigation, audio information is recorded in the VOBs as the audio packs in a manner multiplexed with video information according to the video DVD format. Further, ATS is constituted as ATSI including APGCI which is reproduction control information for reproducing audio information recorded in VOBs, and AMG manages only those ATSs. No management information for the titles in the video zone is recorded in AMG.

On the contrary, in the audio/video dual-use DVD, audio information recording area according to the audio DVD format exists separately from and independently of the AV information recording area according to the video DVD format. In the audio zone, the substantial part of the audio information is recorded as a plurality of AOBs in each ATS according to the audio DVD format shown in FIG. 3. Further, not only ATSs which include APGCI serving as the reproduction control information of audio information in each ATS, but ATSs including ATSI including APGCI serving as the reproduction control information of audio information recorded in VOBs in VTSs in the video zone (substantial audio information is recorded in the video zone and only the corresponding ATSI, navigation information therefor, exists as ATS) are recorded. All of these ATSs are managed by AMG. In the video zone, AV information is recorded as a plurality of VTSs. Further, reproduction control information for AV information in each VTS is recorded in VTSI as PCGI, and all of these VTSs are managed by not only VMG and but AMG. More specifically, AMG is the total management information in the case of audio-only DVD and audio/video dual-use DVD, and MG is main management information in the case of video DVD. In the case of video DVD with audio navigation, AMG performs management for only the reproduction of audio information in VOBs by an audio player, and does not manage the video titles.

With the above arrangement, the reproduction apparatus can reproduce information in an appropriate manner according to the ability of those apparatuses, and additionally the optimum compatibility between the discs and the reproduction apparatuses is established.

(4) Reproduction of Audio/Video Dual-use DVD

Next, the description will be given of title reproduction control, which is the characteristic part of the present invention. Here, the title is a series of presentations having common reproduction feature or a part of a presentation, which is composed of substantial information such as AV information and audio information recorded on DVD and reproduction control information indicating the reproduction manner of the substantial information. Prior to the description of the reproduction control of the titles, the titles in the audio DVD format will be described by taking an example of audio/video dual-use DVD.

(4.1) Classification of Titles

First, the title in the audio DVD (i.e., title 261 in FIG. 4) is classified into an audio title established by the reproduction of audio information in the audio zone (hereinafter referred to as "AOTT (Audio Only TiTle)", and a video title established by the reproduction of AV information in the video zone. The video title as further classified into "AVTT (Audio Video TiTle)" in which picture is reproduced without exception, and "AVTT/AOTT (Audio video TiTle/Audio Only TiTle)" in which the AVTT can be reproduced by sound only. It is noted that in the case of video DVD format, all video titles are AVTTS.

AOTT is a title from which only audio information is reproduced, and its substantial information part is constituted by audio information recorded in AOBs in the audio zone. AVTT is a title from which audio information is reproduced in a manner accompanied with video information without exception, and its substantial information part is constituted by AV information recorded in VOBs in the video zone. With respect to AVTT, reproduction of only audio information is not permitted, and it is always necessary to be reproduced together with video information. AVTT/AOTT is a title from which only audio information can be reproduced and from which video information and audio information may be reproduced together. In other words, AVTT/AOTT may be regarded as multi-title which can function as both audio title and video title. In any cases, its substantial information part is constituted by AV information recorded in VOBs in the video zone. Whether the AVTT/AOTT is reproduced as AV information or audio information only depends on the capability of a reproduction apparatus. Namely, a reproduction apparatus without an ability to reproduce AV information (i.e., audio player) reproduces only audio information from AVTT/AOTT, whereas a reproduction apparatus with an ability to reproduce AV information reproduces video information together with audio information from AVTT/AOTT.

AMG records both navigation information for audio player and navigation information for compatible player separately. The navigation information for audio player is an audio title search pointer which describes navigation information for reproducing only audio information of audio titles (AOTT) constituted by audio information in AOBs in the audio zone and audio information of dual-use titles (AVTT/AOTT) constituted by AV information in VOBs in the video zone, and the title search pointers are recorded in an audio-only search pointer table AOTT_SRPT. On the other hand, an audio title search pointer, which is navigation information for a compatible player capable of reproducing any kind of title, is recorded in an audio title search pointer table ATT_SRPT. Those navigation information will be described later in further detail with reference to FIG. 8.

When the audio/video dual-use DVD is reproduced by a video player, the video player refers to the navigation information for video player (i.e., title search pointer table TT_SRPT) recorded in VMG in the video zone and reproduces AV information recorded in each VTS according to the reproduction control information recorded in VTSI. When the audio/video dual-use DVD is reproduced by an audio player, the audio player refers to AOTT_SRP in the AMG in the audio zone and reproduces the audio information according to the reproduction control information recorded in ATSI. There are two different methods to reproduce audio information by an audio player. In one method, audio information in AOBs are reproduced by referring to AMG in the audio zone and the navigation information ATSI and APGCI recorded in ATS in the audio zone. In the other method, similarly to the case of the DVD with audio navigation, audio information recorded in VTSs in the video zone are reproduced according to AMG, ATS and APGCI. In the latter way, for all objects, the video player reproduces AV information including pictures and the audio player reproduced only audio information.

When the audio/video dual-use DVD is reproduced by a compatible player, the compatible player refers to the navigation information ATT_SRP for the compatible player recorded in AMG of the audio zone and reproduces audio information in the audio zone and AV information in the video zone according to the reproduction control information recorded in ATSI and VTSI in an integrated manner. All titles recorded on the audio/video dual-use DVD are managed by AMG and are classified into one of three kinds of titles of the above-mentioned audio DVD format.

Figure 6:
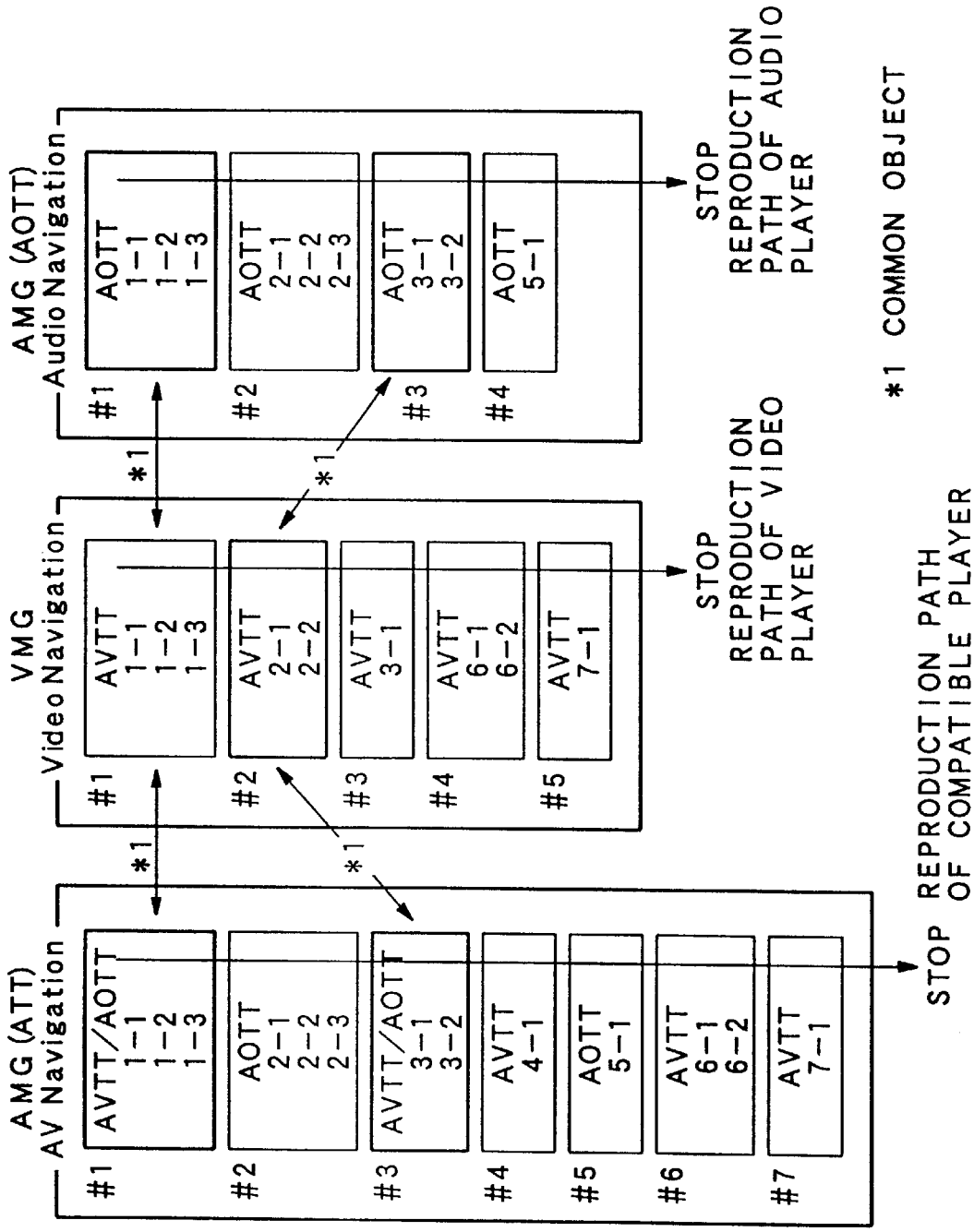
FIG. 6 is a diagram showing an example of audio/video dual-use DVD.

Now, it is assumed that the audio/video dual-use DVD having the logical format shown in FIG. 6 is reproduced by using a compatible player having capability of reproducing information of both the audio DVD format and the video DVD format. In this audio/video dual-use DVD, a volume is logically constituted by seven title groups #1 to #7, and each title group has one title. One title includes one or more tracks. In FIG. 6, the leftmost column shows the contents of the navigation information (ATT_SRP) of the compatible player, the center column shows the contents of the navigation information (TT_SRP) of the video player, and the rightmost column shows the contents of the navigation information (AOTT_SRP) of the audio player.

Since the title #2 and #5 are AOTT, when reproducing them, only the audio information recorded in AOBs in the audio zone of the audio/video dual-use DVD are reproduced. Since titles #4, #6 and #7 are AVTT. when reproducing them, AV information recorded in VOBs in the video zone of the audio/video dual-use DVD are reproduced. Further, since the titles #1 and #3 are AVTT/AOTT, when reproducing them, the compatible player reproduces both picture and sound based on the video and audio information recorded in the VOBs in the video zone of the audio/video DVD. It is noted that, when using an audio player without an ability to reproduce video information, only audio information recorded in VOBs in the video zone of the audio/video dual-use DVD is reproduced from the titles #1 and #3 (see. the rightmost column in FIG. 6). Namely, AVTT/AOTT titles are designed such that recorded contents of the title can be reproduced with its maximum capability and possibility of a reproduction apparatus that is used in reproducing the audio/video dual-use DVD. It is noted that AVTT is not permitted to constitute a title group together with other kinds of titles (i.e., AOTT or AVTT/AOTT) in order to avoid disorder in reproducing title groups.

(4.2) Dual-management of VOB

Next, the description will be given of PGCI and APGCI which are defined in respect to VOB in the video zone of the audio/video dual-use DVD. In VOB, video data and audio data are recorded in the multiplexed manner. When reproducing VOB as AV information, it is reproduced according to PGCI, and this is the same concept as the case of the video DVD. Thus, by recording manner and reproducing manner of AV information in the audio DVD is adapted to the video DVD format, the compatibility with the video player is ensured. On the other hand, when reproducing only audio information in VOBs, it is reproduced according to APGCI, and the PGCI is defined independently of PGCI. This will be described in detail with reference to FIG. 7.

Figure 7:
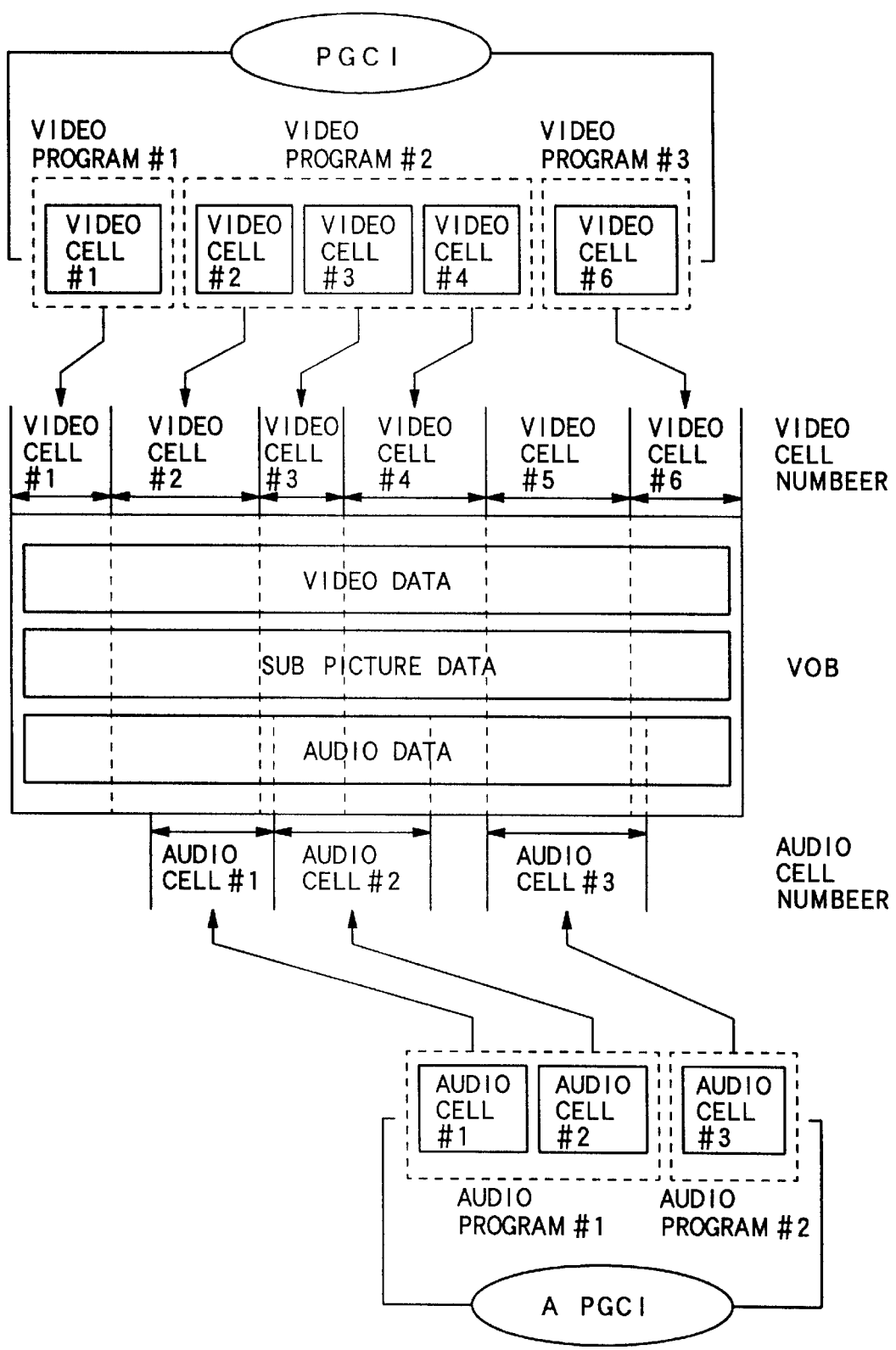
FIG. 7 is a diagram schematically showing the concept of a dual management of an identical object.

FIG. 7 shows the concept of program in the cases where a certain VOB is reproduced as AV information according to PGCI and is reproduced as audio information only according to APGCI. In FIG. 7, the VOB includes video data, sub-picture data and audio data. When the VOB is reproduced as AV information, the reproduction control is performed according to PGCI. The PGCI divides the VOB into 6 video cells #1 to #6, wherein video cell #1 constitutes the video program #1, the video cells #2 to #4 constitute the video program #2 and the video cells #6 constitutes the video program #3. The reproduction is performed according to the PGCI as illustrated, when AV information like AVTT/AOTT is reproduced by a video player and a compatible player.

On the other hand, when reproducing only audio information from the same VOB by an audio player, the reproduction is performed according to the APGCI. The audio programs defined by the APGCI is constituted by one or more audio cells. It is noted that the audio cell can be defined differently from and independently of the video cell, even for the same object (VOB) (of course the audio cell can be defined to be identical to the video cell). In other words, the start position and/or the end position of each audio cell can be defined to be different from and independent of those of the video cell. Further, the reproduction order of the audio cell, which is defined by APGCI, can be defined independently of the reproduction order of the video cell, which is defined by the PGCI.

In the example of FIG. 7, the audio program #1 is constituted by the audio cells #1 and #2, and the audio program #2 is constituted by the audio cell #3. The APGCI includes information relating to the recording positions and reproduction order of the audio cells included in the audio programs, according to which the audio information is reproduced.

The reason why the independent definition of the audio cell and the video cell is permitted is to manage audio information and video information independently of each other. By doing so, time management and the like may be performed independently of AV information when only audio information in VOBs is reproduced. Further, only audio information part, which is meaningful if it is reproduced by itself, can be reproduced independently of the video information part. It is again noted that, of course, the audio cell can be defined to be identical to video cell.

(4.3) Description of Navigation Information

Figure 8:
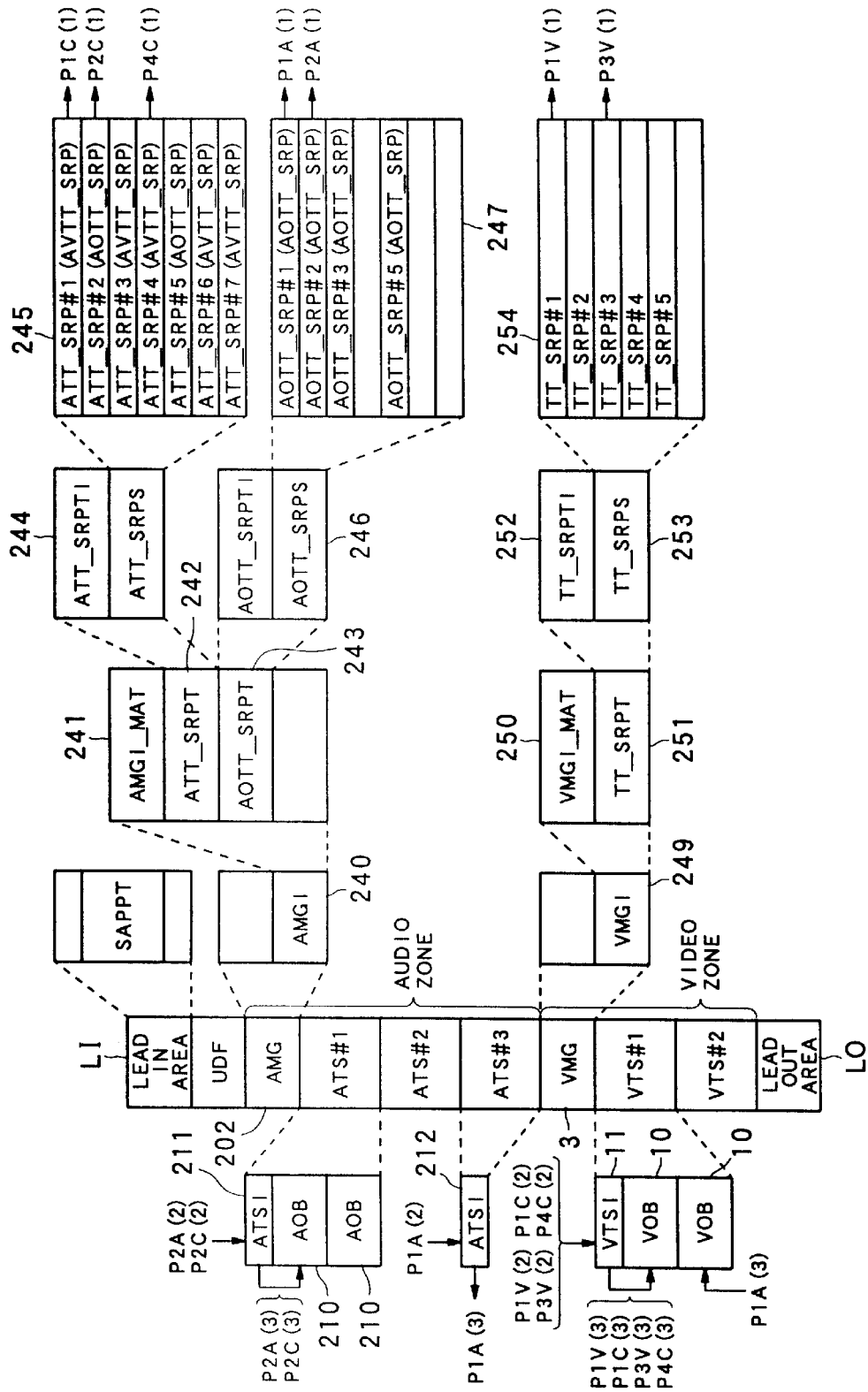
FIG. 8 is a diagram showing an example of navigation information defined for the audio/video dual-use DVD shown in FIG. 6.

Next, the reproduction control of each title in the audio/video dual-use DVD will be described with reference to FIGS. 6 and 8. FIG. 8 shows an example of the physical format of an audio/video dual-use DVD and navigation information recorded thereon. As described above, the audio/video dual-use DVD has the video zone in conformity with the video DVD format and the audio zone in conformity with the audio DVD format. Information reproducible from the audio/video dual-use DVD is AV information (picture information with sound) such as movie, and audio information. The navigation information for various kind of player is separately recorded on the audio/video dual-use DVD so that no disorder and/or inconsistency takes place when it is reproduced by various kinds of players.

(4.3.1) AMG, ATSI, Title Search Pointer Table

In FIG. 8, the audio/video dual-use DVD has the audio zone and the video zone. The audio zone includes the AMG 202, the ATS#1, the ATS#2 and the ATS#3. The ATS#1 includes the ATSI 211 and the AOBs 210, and the ATS #3 includes only the ATSI 212. Also, the video zone includes the VMG 3, the VTS#1 and VTS#2, and the VTS#1 includes the VTSI 11 and the VOBs 10. The AMG 202 includes the AMGI (AMG Information) 240 which is the substantial part of the navigation information. The AMGI 240 includes the AMGI management table 241 including information such as the file size and/or recording address of AMGI 240, the ATT search pointer table 242 and the AOTT search pointer table 243. Here, the search pointer is a pointer which indicates the recording position of the reproduction control information of each title on the DVD. As mentioned above, each title is constituted by the substantial information such as audio information and/or AV information, and the reproduction control information used to reproduce the substantial information in an mixed manner. The reproduction control information is recorded in the ATSI in the ATS or in the VTSI in the VTS. The search pointer indicates the recording position of the reproduction control information of each title within the ATSI or VTSI. It is noted that the navigation information is used to manage the reproduction of each title, and conceptually includes the search pointer in the present invention.

In the ATT search pointer table 242, the navigation information used in reproducing each titles in the audio/video dual-use DVD by a compatible player is recorded. On the contrary, in the AOTT search pointer table 243, the navigation information used in reproducing each title of the audio/video dual-use DVD by an audio player is recorded. The ATT search pointer table 242 and the AOTT search pointer table 243 correspond to each other in the one-to-one relationship, and the number of the search pointers described in the ATT search pointer table 242 equals to the number of the titles recorded on the audio/video dual-use DVD. For example, as shown in FIG. 6, if the audio/video dual-use DVD includes seven titles in total, seven search pointers corresponding to the seven titles are described in the ATT search pointer table 242, and similarly seven frame corresponding to the seven titles are prepared in the AOTT search pointer table 243, regardless of the kind of the titles. In addition, the frame of those search pointer tables are in one-to-one correspondence.

(4.3.1.1) ATT_SRP

The audio title search pointer (ATT_SRP) is navigation information used in reproducing the audio/video dual-use DVD by a compatible player. Therefore, when the audio/video dual-use DVD is set, the compatible player refers to the ATT_SRP to reproduce each title.

The example shown in FIG. 8 corresponds to the audio/video dual-use DVD shown in FIG. 6, and hence the titles #1 and #3 are dual-use titles (AVTT/AOTT), titles #2 and #5 are audio titles (AOTT) and the titles #4, #6 and #7 are video-dedicated titles (AVTT). As described above, the audio/video dual-use DVD may record three kinds of titles (i.e., AOTT, AVTT/AOTT and AVTT). Therefore, in the case of audio/video dual-use DVD, search pointers related to all three kinds of titles are described in the ATT search pointer table 242. However, the title search pointer 245 actually described in the ATT search pointer table 242 in FIG. 8 are only the audio title search pointer (AOTT_SRP) or the video-dedicated title search pointer (AVTT_SRP), and the title search pointer for the dual-use title (AVTT/AOTT) is described as the video-dedicated title search pointer (AVTT_SRP) (actual description is shown in the parentheses in FIG. 8). This is because it is unnecessary for the compatible player to distinguish the dual-use title (AVTT/AOTT) and the video-dedicated title (AVTT) from each other. Namely, the compatible player has an ability to reproduce the video DVD format and reproduces all of the dual-use title as video information. Therefore, navigation information itself is not needed to be distinguished from the video search pointer (AVTT_SRP). Accordingly, all titles which are reproduced with pictures are described as the dual-use titles (AVTT_SRP) by a normal description.

Thus, as is recognized by comparing the leftmost column of FIG. 6 with the audio title search pointer table 245 of FIG. 8, in the ATT search pointer table 242 describing the navigation information for the compatible player, video-dedicated title search pointers (AVTT_SRP) are described for the video-dedicated title (titles #4, #6, #7) and the dual-use titles (titles #1, #3 ), and AOTT search pointers (AOTT_SRP) are described for the audio titles (titles #2, #5). The compatible player refers to this table 242 to reproduce the titles #1, #3 , #4, #6 and #7 as AV information and the titles #2 and #5 as audio information.

(4.3.1.2) AOTT_SRP

On the other hand, in the AOTT search pointer table 243, the navigation information for the audio player is described. Therefore, if the audio/video dual-use DVD is set, the audio player refers to the AOTT search pointer table 243 to reproduce AOTT. In this table 243, the search pointers related to the audio title (AOTT) and the dual-use title (AVTT/AOTT) are described. Since the audio player does not have an ability to reproduce AV information, it is unnecessary to describe search pointers for video-dedicated title (AVTT). However, actually only the AOTT search pointer are described in this table 243. The audio player only needs information as to whether only the sound can be reproduced from the title or not, and it is unnecessary to distinguish the audio title (AOTT) and dual-use title (AVTT/AOTT). Accordingly, in the audio title (AOTT) search pointer table 243, audio title (AOTT) and the dual-use title (AVTT/AOTT) are not distinguished from each other, and both are described as AOTT search pointer (AOTT_SRP) in a common description. Consequently, with respect to the dual-use titles (AVTT/AOTT), the video-dedicated title search pointer (AVTT_SRP) is described in the above ATT search pointer table 242, and the audio title search pointer (AOTT_SRP) is described in the AOTT search pointer table 243.

It is noted that, with respect to the video-dedicated title (AVTT), only the frames in which the title search pointer is described is prepared, and no substantial information is described therein, or it is described therein that the title has no AOTT_SRP (i.e., audio-only reproduction is not possible). This is because the AOTT search pointer table 243 describes the navigation information for the audio player and the audio player cannot reproduce AV information.

Accordingly, the audio player judges that the title is not reproducible, and disregards the description. By referring to the AOTT search pointer table 243 thus described, the audio player performs the reproduction as shown in the rightmost column of FIG. 6. Namely, the audio player disregards the video-dedicated titles #4, #6 and #7, and reproduces audio information for the titles #1, #2, #3 and #5.

(4.3.2) VMG, VTSI, Title search pointer table

The VMG 3 includes the VMGI (VMG Information) 249 which is the substantial part of the navigation information. The VMGI 249 includes the VMGI management table 250 including the file size and the recording address of the VMGI, and the title search pointer table (TT_SRPT) 251. The title search pointer table 251 is a table in which navigation information for the video player is described. Therefore, the video player refers to the title search pointer table (TT_SRPT) 251 to reproduce the titles according to the manner determined by the video DVD format. The title mentioned here includes two kinds: the dual-use title (AVTT/AOTT) and the video-dedicated title (AVTT), but those two kinds of titles are described in the title search pointer table (TT_SRPT) 251 simply as TT_SRP, without being distinguished from each other.

As described above, the audio/video dual-use DVD prepares the optimum navigation information for each of the audio player, the video player and the compatible player, and records them in the form of three different title search pointer tables. By this, appropriate reproduction can be achieved dependently upon the ability of the respective reproduction apparatuses.

(4.4) Structure of Search Pointer Table

Next, the structure of the search pointer table will be described in more detail.

(4.4.1) ATT_SRP, AOTT_SRP, TT_SRP

The ATT search pointer table 242 includes ATT search pointer information 244 including the number of the ATT search pointers, and a plurality of ATT search pointers 245. It is noted that the kinds of the search pointers actually described are shown in the parenthesis of FIG. 8. As mentioned above, the search pointers described in the ATT search pointer table 242 are either one of AOTT_SRP or AVTT_SRP.

Similarly, the AOTT search pointer table 243 includes AOTT search pointer information 246 including the number of the AOTT search pointers and so on, and a plurality of AOTT search pointers 247. The kinds of the search pointers actually described are shown in the parenthesis of FIG. 8. As already described, the search pointers described in the AOTT search pointer table 243 are nothing but AOTT_SRP. The ATT search pointer and the AOTT search pointer designating the same title should be located at the same position on each search pointer table. Namely, the ATT search pointer on the ATT search pointer table 242 and the AOTT search pointer on the AOTT search pointer table 243 are in one-to-one correspondence, and ATT_SRP#1 and AOTT_SRP#1 designate the same title.

Similarly, the TT search pointer table 251 includes TT search pointer table information 252 including the number of the TT search pointers and so on, and a plurality of TT search pointers 254. The ATT search pointer 245 and the AOTT search pointer 247 are in one-to-one correspondence, however, they are not necessarily in one-to-one corresponding with the TT search pointer 254. The TT search pointer 254 also represents the reproduction order of the titles by designating the PGCs which logically constituting the titles, and TT search pointer is similar to the ATT search pointer and the AOTT search pointer in this respect.

(5) Reproduction Methods of Titles

Next, the reproduction methods of the three kinds of titles recordable on the audio/video dual-use DVD will be described, with reference to FIGS. 6 and 8, by classifying by the players that reproduce the titles. It is noted that normally each player knows that the player itself is which one of the video player, the audio player and the compatible player. This may be achieved by storing, in advance, identification information of the kind of the player itself in an internal memory at the manufacturing stage or at certain later stage, for example. Alternatively, the player may be designed such that the user inputs identification information of the kind of the player via input unit. In each player, the system controller first obtains such identification information of the kind of the player, and then starts the reproduction.

(5.1) Reproduction Method of Audio Title (AOTT)

AOTT can be reproduced by an audio player and a compatible player.

(5.1.1) Audio Player

First, the method of reproducing AOTT by an audio player will be described. As already described, the audio player refers only to the AOTT_SRPT 243 as the navigation information. Therefore, the audio player refers to AOTT_SRP#2 and reads out the ATS number (ATS#1) and the title number of the title in that ATS (see. the path "P2A(1)" in FIG. 8). Then, the audio player refers to the ATSI 211 of the corresponding ATS#1 (see. the path "P2A(2)"), and reads out the APGCI to which the title corresponds based on the title number in the ATS. Namely, at the time of reproduction, audio information is reproduced by reproducing the audio packs 43 in the AOB 210 according to the APGCI designated by the AOTT_SRP#2 (see. the path "P2A(3)").

(5.1.2) Compatible Player

Next, the method of reproducing AOTT by a compatible player will be described. The compatible player refers to ATT_SRPT 242 for the navigation information, and recognizes that the title is AOTT because it is AOTT_SRP. Then, like the case of the audio player, the compatible player reads out the ATS number including the title and the title number thereof in the ATS (see. the path "P2C(1)" in FIG. 8). Then, the compatible player refers to the ATS 211 of the corresponding ATS#1 (see. the path "P2C(2)"), and reads out the APGCI to which the title corresponds based on the title number in the ATS. In this way, at the time of reproduction, the compatible player reproduces audio information by reproducing the audio packs 43 in the AOB 210 according to the APGCI designated by the ATT_SRP#2 (see. the path "P2C(3)").

(5.2) Video-dedicated Title (AVTT)

Next, the reproduction path of video-dedicated title will be described. The video-dedicated title can be reproduced by a video player and a compatible player.

(5.2.1) Video Player

The video player refers to the TT search pointer table 251 for the navigation information, and performs processing according to the reproduction manner of the video format. Therefore, the video player first refers to the TT search pointer table 251 in the VMG 3. Here, the description position of the search pointers on the each title search pointer tables 242, 243 of corresponding titles on the audio navigation may not be in one-to-one correspondence with the description position of the title search pointers on the title search pointer table 251 of the VMG 3. Namely, in the ATT search pointer table 242 of AMGI and the TT search pointer table 251 of VMGI, the contents and their order may be defined independently of each other. However, to avoid disorder, if no title corresponding to TT_SRP 254 of VMGI exists in the TT search pointer table 251, the TT search pointer table is described such that the blank frame is filled. Therefore, the title number may be different as shown in FIG. 8. Namely, although seven titles exist in the audio/video dual-use DVD of the example shown in FIG. 6, since the video player does not reproduce AOTT titles #2 and #5, TT_SRP for the five titles other than those two (i.e., titles #1, #2, #3, #4, #5 specified by the title managing number within the VMG) are described in the TT search pointer table 251. Therefore, TT_SRP#1 to #5 in the TT search pointer table 251 correspond to each title #1, #2, #3, #4, and #5 in the VMG shown in FIG. 6, respectively.

TT_SRP 254 indicates PGCs logically constituting the title in question. Therefore, the video player reads out the VTS number (VTS#1) including the title and the title number of the title in the VTS from the search pointer (see. the path "P3V(1)"). Then, the video player refers to the VTSI 11 of the VTS#1 (see. the path "P3V(2)"), and reads out the PGCI to which the title corresponds based on the title number in the VTS. Thus, the video player obtains Ad the PGCI, and reproduces it as AV information by using the video packs and audio packs in the VOBs (see. the path "P3V(3)").

(5.2.2) Compatible Player

Next, the path in which a compatible player reproduces the video-dedicated title (AVTT) will be described. The compatible player refers only to ATT_SRPT for the navigation information. Therefore, the compatible player refers to the ATT_SRP#4, and recognizes that it is the video-dedicated title because the ATT_SRP#4 is the AVTT_SRP. As mentioned above, the title number does not coincide with the title number in the video player. Thereafter, the compatible player reads out the VTS number including the title (VTS#1, in this case) and the title number in the VTS (see. the path "P4C(1)"), similarly to the manner that the video player read out from TT_SRP. Then, the compatible player refers to the VTSI 11 of the corresponding VTS#1 (see. the path "P4C(2)"), and reads out the PGCI corresponding to the title based on the title number in the VTS. Thus, the compatible player also obtains the PGCI and reproduces the title as AV information by using the video packs and audio packs in the VOBs (see. the path "P4C(3)").

(5.2.3) Audio Player

Next, the description will be given of an audio player. The audio player refers only to AOTT_SRPT 243 for the navigation information. So, the audio player reads out the AOTT_SRP#4. However, AOTT_SRP#4 describes that there is no corresponding AOTT, and hence the audio player do not perform reproduction.

(5.3) Dual-use Title (AVTT/AOTT)

The dual-use title is reproduced by an audio player, a video player and a compatible player. Description is given in this order.

(5.3.1) Audio Player

First, the method of reproducing the dual-use title by an audio player will be described. The audio player refers only to AOTT_SRPT for navigation information. Therefore, the audio player refers to AOTT_SRP#1, and reads out the ATS number including the title (ATS#3 in this case) and the title number in that ATS (see. the path "P1A(1)"). Then, the audio player refers to the ATSI 212 of the corresponding ATS#3 (see. the path "P1A(2)"), and reads out the APGCI corresponding to the title based on the title number in the ATS. It is noted that the ATS#3 does not include substantial audio data, and the APGCI indicates the reproduction manner of the VOBS 10 of the VTS#1. Therefore, the audio player reproduces only the audio packs 43 in the VOBs 10 according to this APCGI, thus reproducing audio information only (see. the path "P1A(3)").

(5.3.2) Video Player

Next, the method of reproducing dual-use title by a video player will be described. As described above, the video player performs reproduction according to the reproduction manner of video format, irrespective of the kind of the disc. Therefore, the video player refers to the title search pointer table 251 of the VMG3, wherein the title number #1 is coincident with the title number on the audio navigation. The following path is the same as the case described in the section (5.2.1), and hence the description is omitted (see. the paths "P1V(1)", "P1V(2)", "P1V(3)").

(5.3.3) Compatible Player

Next, the method of reproducing dual-use title by a compatible player will be described. The compatible player only refers to ATT_SRPT for navigation information. Therefore, the compatible player refers to the ATT_SRP#1 and recognizes that the it is AVTT. Thereafter, similarly to the manner that the video player reads out from the TT_SRP, reads out the VTS number including the title (VTS#1, also in this case) and the title number in the VTS based on the ATT_SRP 245 (see. the path "P1C(1)"). The following path is the same as the case of the video player, and hence the description will be omitted. (see. the paths "P1C(2)", "P1C(3)").

As described above, according to the present invention, the DVD has not only the navigation information for both video and audio, but information to integrate or associate them. Thereby, the inconsistency and/or disorder may be avoided if the titles of various different reproduction feature are reproduced by various types of player having different reproduction capabilities.

(6) DVD Player

Next, three types of DVD players will be described in the order of a video player, an audio player and a compatible player.

(6.1) Video Player

Figure 9:
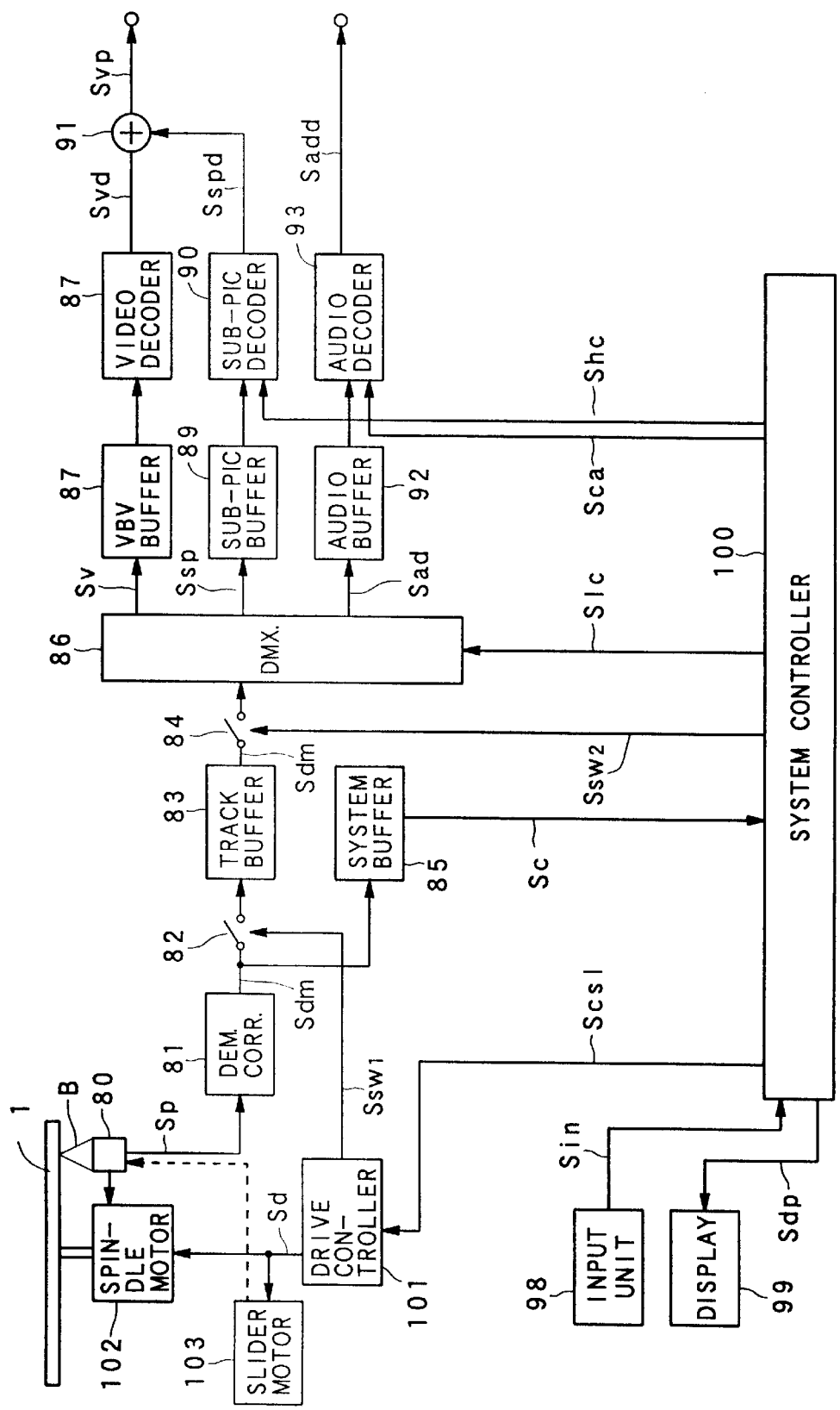
FIG. 9 is a block diagram showing a schematic configuration of a video DVD player.

As shown in FIG. 9, a video DVD player according to the embodiment is provided with: an optical pickup 80; a demodulate and correct unit 81; stream switches 82 and 84; a track buffer 83; a system buffer 85; a demultiplexer 86; a VBV (Video Buffer Verifier) buffer 87; a video decoder 88; a sub picture buffer 89; a sub picture decoder 90; a mixer 91; an audio buffer 92; an audio decoder 93; an input unit 98; a display 99; a system controller 100; a drive controller 101; a spindle motor 102; and a slider motor 103. It is noted that the configuration shown in FIG. 9 only illustrates the portions related to the video and audio reproduction, and the description and the detailed explanation as to servo circuits to servo-control the optical pickup 80, the spindle motor 102, the slider motor 103 and the like are omitted since they are constructed in the same manner as the conventional arts.

Next, an overall operation of the video player will be described.

The optical pickup 80 includes a laser diode, a beam splitter, an objective lens, photo-detectors and the like not illustrated, and irradiates a light beam B as a reproduction light with respect to the DVD 1. The optical pickup 80 receives a reflection light of the light beam B from the DVD 1, and outputs a detection signal Sp corresponding to information pits formed on the DVD 1. At this time, the tracking servo control and the focus servo control are performed with respect to the objective lens etc. of the optical pickup 80 in the same manner as the conventional art so that the light beam B can be irradiated precisely onto the information track of the DVD 1 and that the light beam B can be focused on the information record surface of the DVD 1.

The detection signal Sp outputted from the optical pickup 80 is inputted to the demodulate and correct unit 81, wherein a signal demodulation process and an error correction process are applied to it to generate a demodulation signal Sdm, which is outputted to the stream switch 82 and the system buffer 85.

The opening and closing operation of the stream switch 82, to which the demodulation signal Sdm is inputted, is controlled by a switching signal Sswl from the drive controller 101. When the switch 82 is closed, the stream switch 82 passes the inputted demodulation signal Sdm as it is to the track buffer 83. When the switch 82 is open, the demodulation signal Sdm is not outputted therethrough, so that unnecessary or useless information (signal) is not inputted to the track buffer 83.

The track buffer 83, to which the demodulation signal Sdm is inputted, consists of a FIFO (First In First Out) memory, for example. The track buffer 83 temporarily stores the inputted demodulation signal Sdm, and continuously outputs the stored demodulation signal Sdm when the stream switch 84 is in the closed state.

The opening and closing operation of the stream switch 84, to which the demodulation signal Sdm is continuously inputted, is controlled by a switch signal Ssw2 from the system controller 100 such that the various buffers at its posterior stage may not be over-flown or, on the contrary, may not become empty to stop the decoding process, in the separating process by the demultiplexer 86.

On the other hand, the system buffer 85, to which the demodulation signal Sdm is inputted in parallel with the track buffer 83, accumulates the management information (video manager 3) and the control data for every VTS 4 and the like which are detected firstly upon loading the DVD 1 and which are related to the whole information recorded on the DVD 1. Then, the system buffer 85 outputs the accumulated data as a control information Sc to the system controller 100, and temporarily stores the DSI data 51 for each navi-pack 41 during the reproduction of the information, to output it also as the control information Sc.

The demultiplexer 86, to which the demodulation signal Sdm is continuously inputted through the stream switch 84, separates the video data, the audio data, the sub picture data and the PCI data of each navi-pack respectively from the inputted demodulation signal Sdm, and outputs them as a video signal Sv, a sub picture signal Ssp, an audio signal Sad and a PCI signal Spc respectively to the VBV buffer 87, the sub picture buffer 89 and the audio buffer 92. The demultiplexer 86 extracts the pack headers and packet headers from each packs (including audio packs 43) and packets, and outputs information included in the extracted headers to the system controller 100 as a header signal.

The VBV buffer 87, to which the video signal Sv is inputted, consists of a FIFO memory, for example. The VBV buffer 87 temporarily stores the video signal Sv and outputs it to the video decoder 88. The VBV buffer 87 compensates for the difference or fluctuation in the data amount between respective pictures of the video signal Sv compressed by the MPEG 2 method. Then, the video signal Sv in which the differences in the data amount are compensated for, is outputted to the video decoder 88, and is decoded by the MPEG 2 method to be outputted as a decoded video signal Svd to the mixer 91.

The sub picture buffer 89, to which the sub picture signal Ssp is inputted, temporarily stores the inputted sub picture signal Ssp, and outputs it to the sub picture decoder 90. The sub picture buffer 89 is to synchronize the sub picture data 44 included in the sub picture signal Ssp with the video data 42 corresponding to the sub picture data 44, and to output it. Then, the sub picture signal Ssp synchronized with the video data 42 is inputted to the sub picture decoder 90 and is decoded to be outputted as a decoded sub picture signal Sspd to the mixer 91.

The decoded video signal Svd outputted from the video decoder 88 and the decoded sub picture signal Sspd outputted from the sub picture decoder 90 (which is in synchronization with the corresponding decoded video signal Svd) are mixed together by the mixer 91, and are outputted as a final video signal Svp to be displayed to the display device such as a CRT (Cathode Ray Tube) which is not shown.

The audio buffer 92, to which the audio signal Sad is inputted, consists of a FIFO memory, for example. The audio buffer 92 temporarily stores the audio signal Sad and outputs it to the audio decoder 93. The audio buffer 92 is to synchronize the audio signal Sad with the video signal Sv or the sub picture signal Ssp including the corresponding video information, and delays the audio signal Sad in accordance with the output condition of the corresponding video information. Then, the audio signal Sad, which is time-adjusted to synchronize with the corresponding video information, is outputted to the audio decoder 93. Then, a predetermined decoding process according to linear PCK system is applied thereto to the audio signal Sad based on the header control signal outputted by the system controller 100, and it is outputted as a decoded audio signal Sadd to a speaker etc. not illustrated.

(6.2) Audio Player

Figure 10:
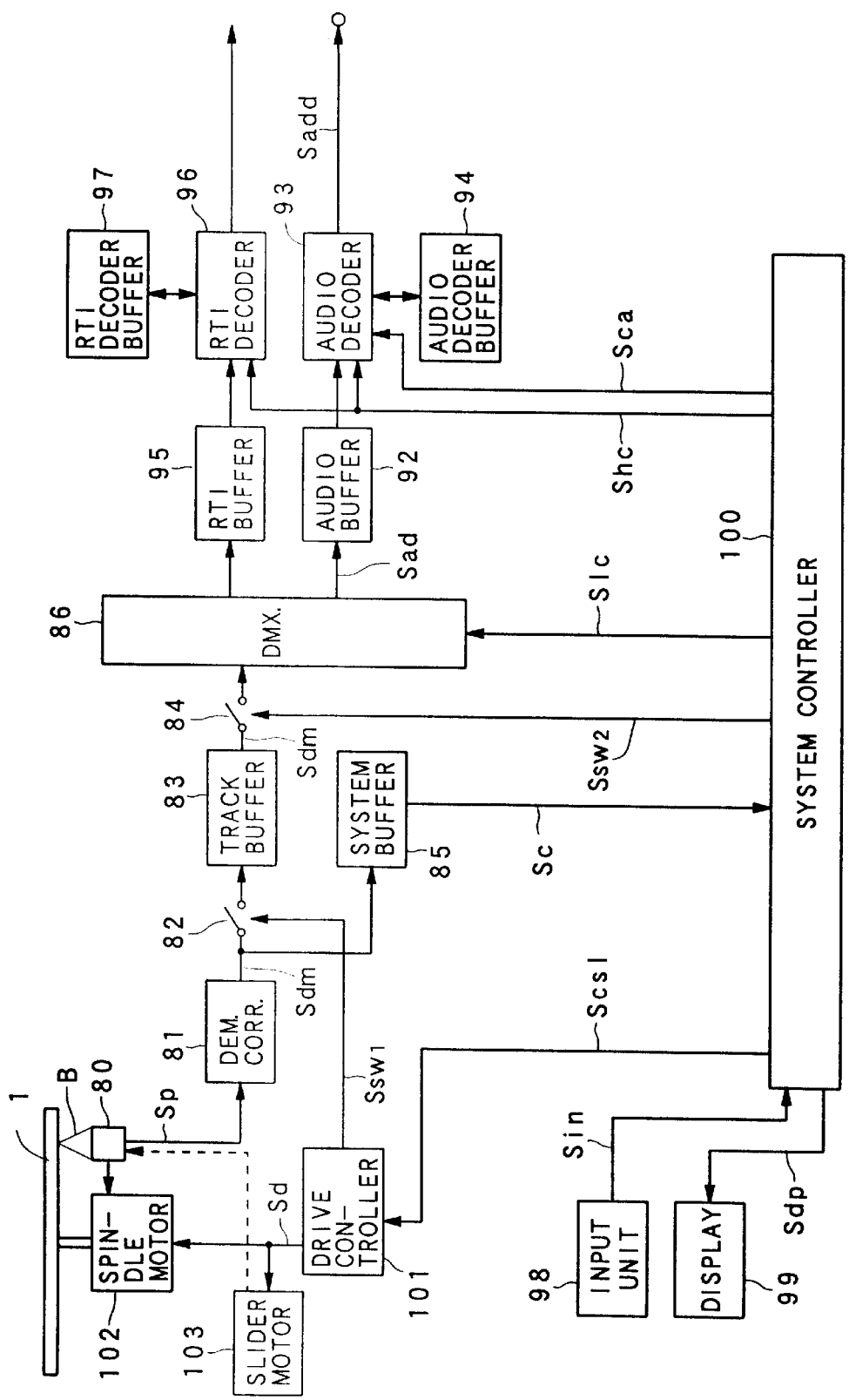
FIG. 10 is a block diagram showing a schematic configuration of an audio DVD player.

Next, the audio DVD player will be described with reference to FIG. 10. As seen in FIG. 10, the audio DVD has the same configuration as the video DVD player except for the posterior stage of the demultiplexer 86. Therefore, the configuration of the posterior stage of the demultiplexer 86 will be described below.

The demultiplexer 86, to which the demodulation signal Sdm is continuously inputted via the stream switch 84, extracts audio information from the demodulation signal Sdm by the pack unit, and outputs it to the audio buffer 92 as the audio signal Sad.

The audio buffer 92, to which the audio signal Sad is inputted, consists of a FIFO memory, for example. The audio buffer 92 temporarily stores the audio signal Sad and outputs it to the audio decoder 93. Then, the audio signal Sad is outputted to the audio decoder 93. Then, a predetermined decoding process according to linear PCM system is applied thereto to the audio signal Sad based on the control signal Shc outputted by the system controller 100, and it is outputted as a decoded audio signal Sadd to a speaker etc. not illustrated. For example, the real-time information such as real-time text is outputted from the demultiplxer 86 to the RTI buffer 95. The data temporarily stored in the RTI buffer 95 is outputted to the RTI decoder 96, based on the control signal Shc outputted from the system controller 100, to perform display of words-of-song and the like on a display not shown.

If it is detected by the system controller 100 that it is necessary to temporarily stop (pause) the audio voice in the reproduction immediately after accessing, a pause signal Sca is outputted from the system controller 100 to the audio decoder 93, so that the output of the decoded audio signal Sadd is stopped temporarily at the audio decoder 93.

(6.3) Compatible Player

Next, the compatible player will be described. The compatible player has the functions of both the video player and the audio player. Namely, referring to the configuration of the video player shown in FIG. 9, by replacing the audio reproduction system following the demultiplexer 86 with the system of the audio player shown in FIG. 10, the compatible player is established. Therefore, no further description will be made for the sake of brevity.

(6.4) Reproduction by Each Player

Next, the description will be given of the reproduction of each title recorded on the audio/video dual-use DVD by three types of DVD players.

Figure 11:
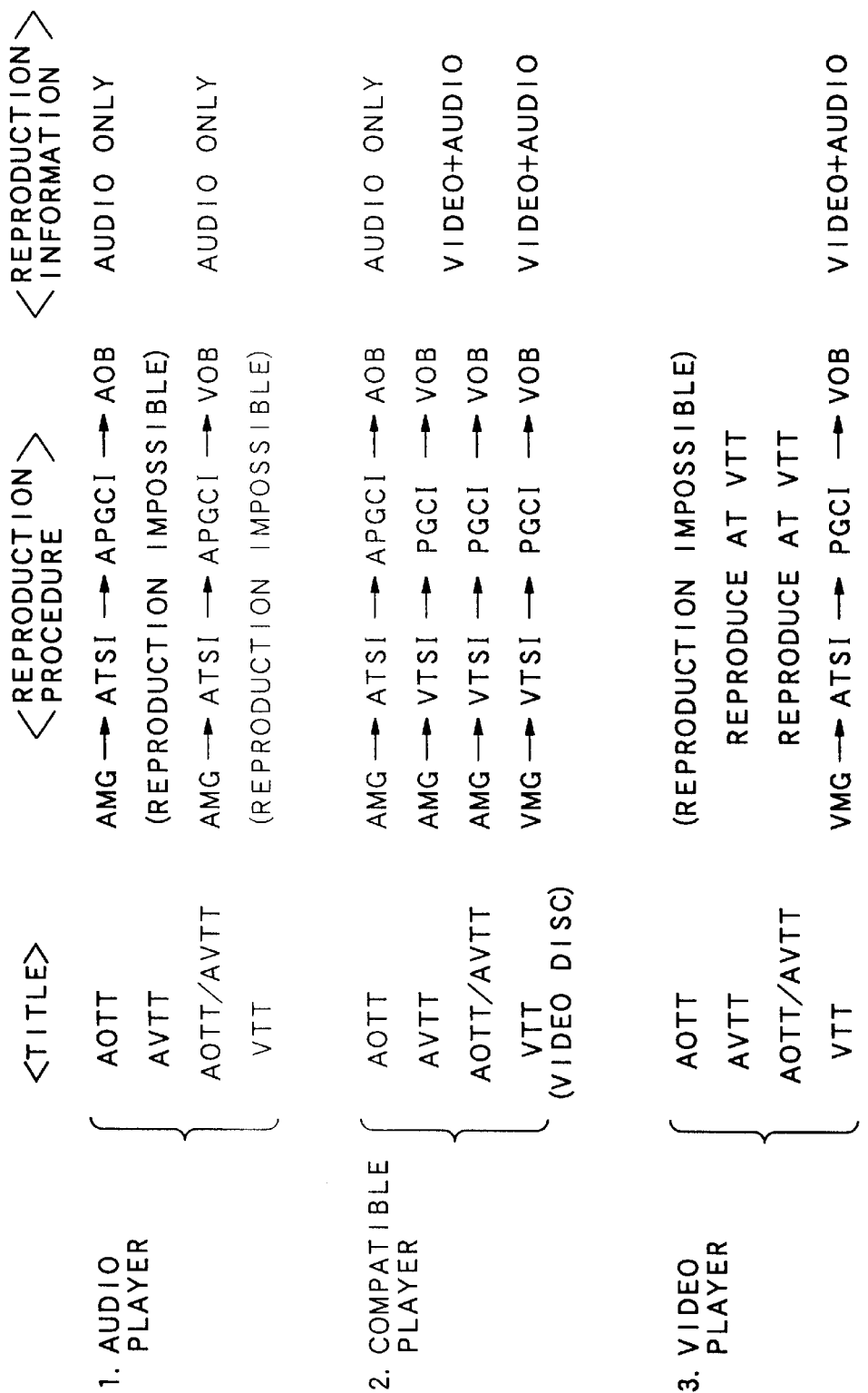
FIG. 11 is a list showing manners of reproducing titles recorded on an audio/video dual-use DVD by means of reproduction apparatuses of different types.

FIG. 11 shows the reproduction method by the player of each type. As the titles recorded on the audio/video dual-use DVD, there are audio title (AOTT), dual-use title (AVTT/AOTT) and video-dedicated title (AVTT). It is noted that "video title" is a generic name of the titles recorded on a video DVD, and the video-dedicated title is substantially equivalent to the video title.

(6.4.1) Audio Player

First, the reproduction of the audio player will be described.

With respect to the audio title (AOTT), the audio player refers to the AOTT search pointer in the AMG and jumps to the ATSI to obtain APGCI. Then, the audio player reproduces the audio information in the AOBs according to the APGCI thus obtained.

The video-dedicated title (AVTT) is a title that must be reproduced together with video information, and hence the audio player cannot reproduce the video-dedicated titles.

With respect to the dual-use title (AVTT/AOTT), the audio player refers to the AOTT search pointer in the AMG and jumps to the ATSI to obtain APGCI. Then, the audio player reproduces only the audio information in VOBs according to the APGCI thus obtained. It is noted that the audio player cannot reproduce AV information as AVTT.

The video title (VTT) is a title in conformity with the video DVD format, and hence cannot be reproduced by the audio player.

(6.4.2) Compatible Player

Next, the reproduction by the compatible player will be described.

With respect to the audio title (AOTT), the compatible player operates in the same manner as the audio player. Namely, the compatible player jumps to the ATSI to obtain APGCI based on the AOTT search pointer in the AMG, and reproduce only the audio information in the AOBs.

With respect to the video-dedicated titles (AVTT), the compatible player reproduces AV information. Namely, the compatible player jumps to the VTSI designated by the ATT search pointer in the AMG to obtain PGCI, and then reproduce AV information from VOBs based on the PGCI thus obtained.

With respect to the dual-use title (AVTT/AOTT), the compatible player reproduces AV information like the manner of the video-dedicated title (AVTT/AOTT). The dual-use title (AVTT/AOTT) is a title which can be reproduced in various way according to the ability of the player. Since the compatible player has an ability to reproduce AV information, it operates to reproduce AV information. Namely, the compatible player jumps to the VTSI designated by the ATT search pointer in AMG to obtain PGCI, and reproduces AV information from VOBs based on the PGCI thus obtained.

The compatible player reproduces VTT title of the video DVD in the same manner as the video player. Namely, the compatible player jumps to the VTSI designated by the VTT search pointer in VMG to obtain PGCI, and then reproduces AV information in VOBs based on the PGCI thus obtained.

(6.4.3) Video Player

Next, the reproduction by the video player will be described.

The video player does not have an ability to reproduce audio information according to audio DVD format, and hence cannot reproduce the audio titles (AOTT).

With respect to the video-dedicated title (AVTT) and dual-use title (AVTT/AOTT), the video player does not operate via the paths passing through AMG because those titles are in conformity with audio DVD format. However, with respect to the videodedicated title (AVTT) and the dual-use title (AVTT/AOTT) in the audio DVD disc, since the same title is defined as the video titles (VTT) according to the video DVD format, those titles can be substantially reproducible by reproducing those video titles (VTT). Therefore, the video player reproduces all of video-dedicated titles (AVTT) and dual-use titles (AVTT/AOTT) titles as video titles (VTT).

With respect to video titles (VTT), the video player jumps to the VTSI designated by the TT title search pointer in VMG to obtain PGCI, and reproduces AV information in VOBs based on the PGCI thus obtained.

As described above, according to the audio/video dual-use DVD of the present invention, separate navigation information are prepared for the players of different types and described in the title search pointer tables so that the player of each type can take advantage of its ability to reproduce information from the audio/video dual-use DVD, thereby enabling optimum reproduction by those reproduction apparatuses.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No.10-065057 filed on Mar. 16, 1998 including the specification, claims, drawings and summary is incorporated herein by reference in its entirety.

What is claimed is:

1. An information storage medium comprising:
    a video zone for recording audio/video information including video information and audio information associated with the video information;
    an audio zone for recording audio information;
    first navigation information for a video player which reproduces the audio/video information in the video zone;
    second navigation information for an audio player which reproduces the audio information in the video zone and the audio information in the audio zone; and
    third navigation information for a compatible player which reproduces both the audio/video information and the audio information, wherein the first navigation information, the second navigation information and the third navigation information are recorded separately from each other.

2. An information storage medium according to claim 1, wherein the first navigation information defines a reproduction manner of the audio/video information from the video zone, the second navigation information defines a reproduction manner of the audio information from the audio zone and a reproduction manner of only the audio information from the video zone, and the third navigation information defines a reproduction manner of the audio information from the audio zone and a reproduction manner of the audio/video information from the video zone.

3. An information storage medium according to claim 1, wherein one or more title, which is a unit of reproduction, is recorded on the storage medium, and wherein the title is classified into audio titles formed by the reproduction of the audio information in the audio zone and video titles formed by the reproduction of the audio/video information in the video zone.

4. An information storage medium according to claim 3, wherein the video titles include at least one dual-use title in which the audio/video information is reproduced by the video player and the compatible player and the audio information in the audio/video information is reproduced by the audio player.

5. An information storage medium according to claim 4,
    wherein the first navigation information indicates a recording position on the storage medium of reproduction control information used for reproducing the audio/video information in the video title,
    wherein the second navigation information indicates a recording position on the storage medium of reproduction control information used for reproducing the audio information in the audio title and indicates a recording position on the storage medium of reproduction control information used for reproducing the audio information in the dual-use title, and
    wherein the third navigation information indicates a recording position on the storage medium of reproduction control information used for reproducing the audio/video information in the video title including the dual-use title and indicates a recording position on the storage medium of reproduction control information used for reproducing the audio information in the audio title.

6. An information storage medium according to claim 1, wherein the first navigation information is recorded in the video zone, and wherein the second and the third navigation information are recorded in the audio zone.

7. An information storage medium according to claim 5, wherein the reproduction control information of the video title is recorded in the video zone, and wherein the reproduction control information of the audio title is recorded in the audio zone.

8. An information storage medium according to claim 5, wherein the reproduction control information of the dual-use title comprises the reproduction control information for the audio player which is recorded in the audio zone and the reproduction control information for the compatible player which is recorded in the video zone.

9. An information storage medium according to claim 8, wherein, with respect to the video title which is a dual-use title, the reproduction control information of the dual-use title which is specified by the third navigation information and the reproduction control information of the video title which is specified by the first navigation information are recorded at an identical position.

10. An information storage medium according to claim 8, wherein, with respect to the audio title, the reproduction control information of the audio title which is specified by the third navigation information and the reproduction control information of the audio title which is specified by the second navigation information are recorded at an identical position.

11. An information reproduction apparatus which reproduces information from an information storage medium comprising:

a video zone for recording audio/video information including video information and audio information associated with the video information;

an audio zone for recording audio information;

first navigation information for a video player which reproduces the audio/video information in the video zone;

second navigation information for an audio player which reproduces the audio information in the video zone and the audio information in the audio zone; and third navigation information for a compatible player which reproduces both the audio/video information and the audio information, wherein the first navigation information, the second navigation information and the third navigation information are recorded separately from each other, the reproduction apparatus comprising:

an identifying means for identifying the apparatus as one of the video player, the audio player and the compatible player;

a selecting means for selecting one of the first navigation information, the second navigation information and the third navigation information based on the identification by the identifying means; and a reproducing means for reproducing recorded information from the storage medium based on the navigation information selected by the selecting means.

12. An information reproduction apparatus which reproduces information from an information storage medium comprising:

a video zone for recording audio/video information including video information and audio information associated with the video information;

an audio zone for recording audio information;

first navigation information for a video player which reproduces the audio/video information in the video zone;

second navigation information for an audio player which reproduces the audio information in the video zone and the audio information in the audio zone; and third navigation information for a compatible player which reproduces both the audio/video information and the audio information, wherein the first navigation information, the second navigation information and the third navigation information are recorded separately from each other, the reproduction apparatus comprising:

an identifying unit for identifying the apparatus as one of the video player, the audio player and the compatible player;

a selecting unit for selecting one of the first navigation information, the second navigation information and the third navigation information based on the identification by the identifying means; and a reproducing unit for reproducing recorded information from the storage medium based on the navigation information selected by the selecting unit.

* * * * *